United States Patent
Guironnet et al.

(10) Patent No.: US 10,370,521 B2
(45) Date of Patent: Aug. 6, 2019

(54) METHODS FOR SYNTHESIS OF POLYOLEFIN-CONTAINING BLOCK COPOLYMERS

(71) Applicant: The Board of Trustees of the University of Illinois, Urbana, IL (US)

(72) Inventors: Damien S. Guironnet, Urbana, IL (US); Dylan J. Walsh, Sun Prairie, WI (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 74 days.

(21) Appl. No.: 15/809,847

(22) Filed: Nov. 10, 2017

(65) Prior Publication Data

US 2018/0134833 A1 May 17, 2018

Related U.S. Application Data

(60) Provisional application No. 62/420,819, filed on Nov. 11, 2016.

(51) Int. Cl.

| | |
|---|---|
| *C08F 293/00* | (2006.01) |
| *C08K 5/541* | (2006.01) |
| *C08K 5/54* | (2006.01) |
| *C08F 10/02* | (2006.01) |
| *C08F 20/06* | (2006.01) |
| *C08F 4/80* | (2006.01) |
| *C08F 110/02* | (2006.01) |
| *C08F 110/06* | (2006.01) |
| *C08G 81/02* | (2006.01) |
| *C08G 83/00* | (2006.01) |

(52) U.S. Cl.
CPC ............... *C08K 5/541* (2013.01); *C08F 4/80* (2013.01); *C08F 10/02* (2013.01); *C08F 20/06* (2013.01); *C08F 110/02* (2013.01); *C08F 110/06* (2013.01); *C08F 293/005* (2013.01); *C08G 81/027* (2013.01); *C08G 83/003* (2013.01); *C08G 83/005* (2013.01); *C08K 5/5403* (2013.01); *C08F 2438/00* (2013.01); *C08F 2438/01* (2013.01); *C08F 2810/40* (2013.01)

(58) Field of Classification Search
CPC ............... C08F 293/005; C08F 2810/40; C08F 2438/01; C08F 2438/00; C08F 2438/02; C08F 2438/03

See application file for complete search history.

(56) References Cited

PUBLICATIONS

Chen et al., "Synthesis, Structure, and Property of Well-Defined Polymethylene-Based Diblock Copolymers by a Combination of Living Polymerization of Ylides and Atom Transfer Radical Polymerization," J. Polym. Sci. Part A Polym. Chem., 47(21):5671-5681, Nov. 2009.
Cherian et al., "Synthesis of Allyl-Terminated Syndiotactic Polypropylene: Macromonomers for the Synthesis of Branched Polyolefins," Macromolecules, 38(15):6259-6268, Jun. 2005.
Erberich et al., "Polyglycidols with Two Orthogonal Protective Groups: Preparation, Selective Deprotection, and Functionalization," Macromolecules, 40(9):3070-3079, Apr. 2007.
Garber et al., "Efficient and Recyclable Monomeric and Dendritic Ru-Based Metathesis Catalysts," J. Am. Chem. Soc., 122(34):8168-8179, Aug. 2000.
Guironnet et al., "Control of Molecular Weight in Ni(II)-Catalyzed Polymerization via the Reaction Medium," Chem. Commun., 40:4965-4967, Oct. 2008.
Johnson et al., "New Pd(II)- and Ni(II)-Based Catalysts for Polymerization of Ethylene and .alpha.-Olefins," J. Am. Chem. Soc., 117(23):6414-6415, Jun. 1995.
Ma et al., "The Preparation of T-Butyl Acrylate, Methyl Acrylate, and Styrene Block Copolymers by Atom Transfer Radical Polymerization: Precursors to Amphiphilic and Hydrophilic Block Copolymers and Conversion to Complex Nanostructured Materials," J. Polym. Sci. Part A Polym. Chem., 38(S1):4805-4820, Dec. 2000.
Mori, K., "Pheromone Synthesis. Part 255: Synthesis and GC—MS Analysis of Pheromonal Triacylglycerols of Male *Drosophila* Fruit Flies," Tetrahedron, 70(35):5752-5762, Sep. 2014.
Pitet et al., "Nanoporous Linear Polyethylene from a Block Polymer Precursor," J. Am. Chem. Soc., 132(24):8230-8231, Mar. 2010.
Resconi et al., "Highly Regiospecific Zirconocene Catalysts for the Isospecific Polymerization of Propene," J. Am. Chem. Soc., 120(10):2308-2321, Mar. 1998.
Villard et al., "Highly Diastereoselective Synthesis of Two Analogues of Dihydrosphingosine," Tetrahedron: Asymmetry, 9(4):607-611, Feb. 1998.
Wiedemann et al., "Monofunctional Hyperbranched Ethylene Oligomers," J. Am. Chem. Soc., 136(5):2078-2085, Jan. 2014.
Zhang et al., "Water-Soluble Complexes [(κ2-P,O-Phosphinesulfonato)PdMe(L)] and Their Catalytic Properties," Organometallics, 28(14):4072-4078, Jun. 2009.

*Primary Examiner* — Jeffrey C Mullis
(74) *Attorney, Agent, or Firm* — Haukaas Fortius PLLC; Michael H. Haukaas

(57) ABSTRACT

A methodology is described for the synthesis of polyolefin containing block-copolymers using a catalytic postpolymerization modification strategy. Common polyolefin grades may be converted into macroinitiators using a cross-metathesis reaction. The functionalized polyolefins may then be used to initiate living: coordinative ring opening polymerization of cyclic ester monomer, anionic ring opening polymerization of epoxide monomer, and radical polymerization of vinylic monomer, to yield the corresponding block copolymers.

20 Claims, 7 Drawing Sheets

Spectrum of *l*-HDPE progressing through the methodology

Top: alkene functionalized *l*-HDPE. Middle: *l*-HDPE after cross metathesis, entry 1-1. Bottom: *l*-HDPE-b-PLA, entry 2-1.

Synthesis of 3-miktoarm star $^1$H NMR of *l*-HDPE with spike (d$_2$-TCE, 95 °C)

$^1$H NMR of HBPE with spike (d$_2$-TCE, 120 °C)

METHODS FOR SYNTHESIS OF POLYOLEFIN-CONTAINING BLOCK COPOLYMERS

RELATED APPLICATIONS

This application claims priority under 35 U.S.C. § 119(e) to U.S. Provisional Patent Application No. 62/420,819, filed Nov. 11, 2016, which is incorporated herein by reference.

BACKGROUND

Over the past few decades, block copolymers have emerged as a class of soft materials with a wide range of technological applications. Due to the high tunability of their chemical structure (i.e., morphology, architecture and domain size), block copolymers have been utilized as surfactants, thermoplastic elastomers, nano-templates, membranes, etc. Controlled polymerization, such as ionic, controlled radical (i.e., ATRP, NMP, RAFT), and ring opening polymerization have been the standard means utilized for producing block copolymers. While these methods have proven useful, they lack the ability to homopolymerize the world's two most produced and inexpensive monomers: ethylene and propylene.

Polyolefins are generally produced industrially via catalytic insertion (co)polymerization of ethylene, propylene, and linear α-olefins on the scale of 70×10$^6$ metric tons per year. The tunability of the polymer's crystallinity offers a mixture of properties, such as, toughness, elasticity, solvent resistance, etc., which are difficult to reproduce economically by other monomers. Therefore, the incorporation of polyolefins into block copolymers would be of significant value, as it would further expand the usefulness of the largest family of polymers in our society. However, due to the high oxophilicity of the insertion metal catalysts used in industry, commercial polyolefin block copolymers have been limited to apolar monomers, which also limits applications. Hence, the synthesis of functionalized block copolymers containing polyolefins remains a modern challenge for synthetic chemists.

Over the years, alternative approaches have been developed to synthesize functionalized polyolefin block copolymers. Most approaches rely on the formation of (semi-) telechelic polymers, which can be used to introduce a polar functionality. One of the most popular of these approaches employs the anionic polymerization of butadiene quenched by an epoxide, followed by the hydrogenation of the polymer to yield a hydroxyl terminated linear low density polyethylene (LLDPE) block. This approach may be efficient, but it is not compatible with the synthesis of polypropylene blocks and uses stoichiometric amounts of a pyrophoric initiator. Ring opening metathesis (ROMP) of cyclic alkenes has also been implemented to yield telechelic high density polyethylene (HDPE). Despite the success of these approaches, employing monomers such as butadiene and cyclic alkenes remains less favorable than the direct polymerization of ethylene. Furthermore, the inability of these approaches to yield block copolymers containing stereoregular polypropylene (PP) is limiting. Living insertion polymerizations have also been reported to produce telechelic polyolefins from ethylene and propylene. However, these systems only produce one polymer chain per metal, which drastically limits their commercial potential. Chain transfer insertion polymerizations have also been reported to yield multiple chains of polymer per catalytic site. However, this approach still requires high loadings of metal(loid) chain transfer agents and also provides low stereocontrol.

Some groups have employed postpolymerization modification techniques to convert vinylic terminated polyolefins into macroinitiators. Hydrosilation, thiol-ene, hydroalumination and esterification reactions have been applied with moderate to high conversions. It is worth noting that these reactions were only performed on low molecular weight vinylic terminated polyolefins ($M_n$<5 kg/mol). The non-quantitative conversion of most of these reactions and the exclusive reactivity toward the vinyl terminated polymers (which is catalyst dependent and often not the most common end-group) drastically restricts the impact of these previous methods. Additionally, in-situ cross coupling compatiblization has been recently reported resulting in a process with less than 50% efficiency for producing the desired block copolymer.

The approach described in this patent aims to address these limitations by offering a more universal and versatile platform that quantitatively converts mono and substituted (e.g., disubstituted) alkene terminated polyolefins of essentially any molecular weight into block copolymers.

SUMMARY

We have developed a powerful and efficient methodology to prepare a wide variety of polyolefin-containing block copolymers. In various embodiments, our method for preparing a polyolefin-containing block copolymer proceeds through three consecutive reactions comprising:

(a) preparing an alkenyl terminated polyolefin via an insertion polymerization reaction of an olefin monomer;

(b) preparing a polyolefin macroinitiator by functionalizing the alkenyl end group of the polyolefin of step (a) via a catalytic cross metathesis reaction; and (c) carrying out a living polymerization reaction initiated by the polyolefin macroinitiator of step (b);

to provide the polyolefin-containing block copolymer.

In various embodiments, the polyolefin-containing block copolymer comprises polyethylene, polypropylene, poly(1-olefin) or a combination thereof. In various embodiments, the polyolefin-containing block copolymer can be linear or star-shaped.

The olefin monomer of step (a) covers a diverse and broad pool of chemicals. For example, the olefin monomer may have the structure of Formula (I):

where R is linear or branched $C_{1-18}$ alkyl.

Similarly, the the alkenyl terminated polyolefin of step (a) covers a diverse and broad pool of chemicals. For example, the alkenyl terminated polyolefin of step (a) may have the structure of Formula (II):

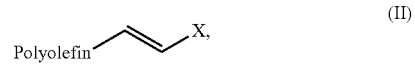

where X is H or linear or branched $C_{1-18}$ alkyl.

In embodiments, the catalytic cross metathesis reaction of step (b) utilizes a metathesis catalyst, such as a ruthenium based catalyst. In various embodiments, the catalytic cross metathesis reaction of step (b) comprises adding a methathesis catalyst and a cross-coupling compound to the alkenyl terminated polyolefin of step (a). In one embodiment, the cross-coupling compound comprises an acrylate.

In various embodiments, the living polymerization reaction of step (c) comprises:
(i) a coordinative Ring Opening Polymerization (cROP) reaction of a cyclic ester monomer;
(ii) an anionic Ring Opening Polymerization (aROP) reaction of an epoxide monomer; or
(iii) an Atom Transfer Radical Polymerization (ATRP) reaction of a vinylic monomer.

In one embodiment, we describe a method for preparing a polyolefin-containing block copolymer via three consecutive reactions comprising:
(a) preparing an alkenyl terminated polyolefin via an insertion polymerization reaction of an olefin monomer;
(b) preparing a polyolefin macroinitiator by functionalizing the alkenyl end group of the polyolefin of step (a) via a catalytic cross metathesis reaction comprising adding a ruthenium based methathesis catalyst and a cross-coupling compound comprising an acrylate to the alkenyl terminated polyolefin of step (a); and
(c) carrying out a living polymerization reaction initiated by the polyolefin macroinitiator of step (b) via: (i) running a coordinative Ring Opening Polymerization (cROP) reaction of a cyclic ester monomer; or (ii) hydrogenating the polyolefin macroinitiator of step (b), then running an anionic Ring Opening Polymerization (aROP) reaction of an epoxide monomer;
to provide the polyolefin-containing block copolymer.

In another embodiment, we describe a method for preparing a polyolefin-containing block copolymer via three consecutive reactions comprising:
(a) preparing an alkenyl terminated polyolefin via an insertion polymerization reaction of an olefin monomer;
(b) preparing a polyolefin macroinitiator by functionalizing the alkenyl end group of the polyolefin of step (a) via a catalytic cross metathesis reaction comprising adding a ruthenium based methathesis catalyst and a cross-coupling compound comprising an acrylate to the olefin terminated polyolefin of step (a); and
(c) carrying out a living polymerization reaction initiated by the polyolefin macroinitiator of step (b) via an Atom Transfer Radical Polymerization (ATRP) reaction of a vinylic monomer;
to provide the polyolefin-containing block copolymer.

The foregoing and other objects and features of the disclosure will become more apparent from the following detailed description, which proceeds with reference to the accompanying figures. Further embodiments, forms, features, aspects, benefits, objects and advantages of the invention shall become apparent from the detailed description and figures provided herewith.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention. The features, objects and advantages will become more readily apparent when consideration is given to the detailed description below. Such detailed description makes reference to the following drawings.

Figure 1:
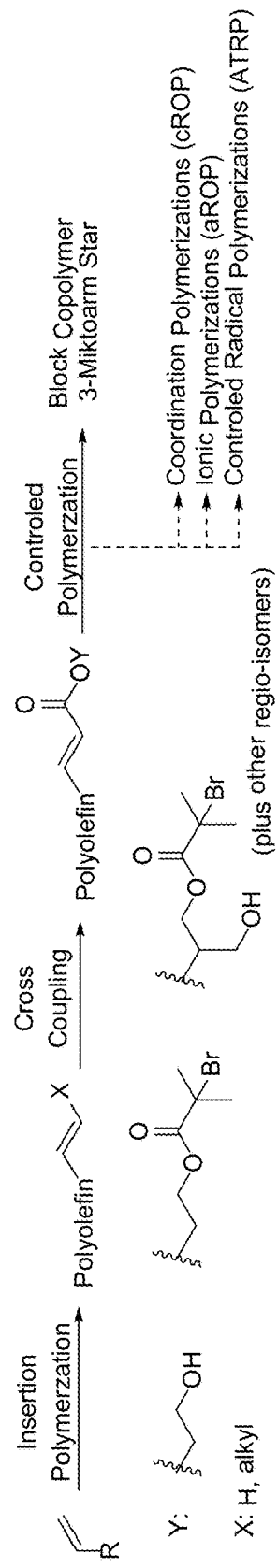
FIG. 1. A general reaction scheme for producing block copolymers and star-shaped polymers.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

We have developed a methodology for the synthesis of polyolefin containing block-copolymers using a catalytic postpolymerization modification strategy. Common polyolefin grades may be converted into macroinitiators using a cross-metathesis reaction. The functionalized polyolefin macroinitiators may then be used to initiate living: coordinative ring opening polymerization of cyclic ester monomer, anionic ring opening polymerization of epoxide monomer, and radical polymerization of vinylic monomer, to yield the corresponding block copolymers. The high activities of the catalysts employed in the different steps offers improved practicality for scalable synthesis.

The methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Definitions

The following definitions are included to provide a clear and consistent understanding of the specification and claims.

All other terms and phrases used in this specification have their ordinary meanings as one of skill in the art to which the invention pertains would understand. Such ordinary meanings may be obtained by reference to technical dictionaries, such as *Hawley's Condensed Chemical Dictionary* 16th Edition (Michael D. Larranaga, Richard J. Lewis, and Robert A. Lewis), John Wiley & Sons, New York, N.Y., 2016. Although any methods and materials similar to or equivalent to those described herein can be used in the practice or testing of the present invention, the preferred methods and materials are described herein.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

The term "quantitative conversion" refers to the amount of macromonomer converted into a block copolymer when practicing the methodology of the present disclosure. The measuring of the amount converted is discussed in the Experimental section below (Section VI. *NMR Conversion Sensitivity Experiments*).

Embodiments

Figure 2:
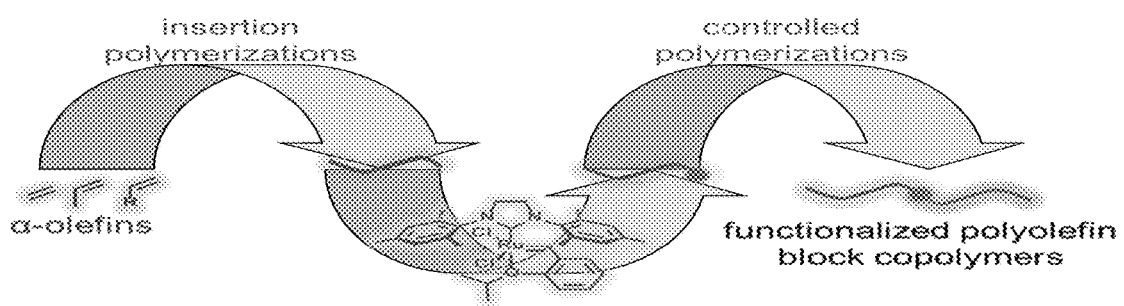
FIG. 2. A pictorial representation for producing block copolymers and star-shaped polymers.

In this patent, we describe general and specific methods for synthsizing block copolymers and star-shaped polymers. In various embodiments, we develop a general methodology to produce block copolymers, such as, HDPE, PP, LLDPE, HBPE (hyperbranched polyethylene) and isoPP containing block copolymers, and star-shaped polymers, such as a 3-miktoarm star polymer. Our approach consists of performing three consecutive reactions: first, a traditional insertion polymerization to yield alkene terminated polyolefins; second, a cross metathesis reaction to functionalize the polyolefin end group; and third, a controlled living polymerization initiated by the end functionalized polyolefins. The reaction scheme is shown in FIG. 1. A pictorial representation is shown in FIG. 2. This approach takes advantage of the selectivity, productivity and chemical versatility of the different catalytic reactions employed.

In step 1, the catalytic olefin polymerization yields exclusively olefin terminated polymers through β-X elimination or chain transfer to monomer. Step 1 takes advantage of the fact that nearly all single site polyolefin catalysts terminate polymer chains through β-hydride elimination. The ability to utilize nearly all single site polyolefin catalysts makes it straightforward to generate a library of mono-alkene polyolefins. Moreover, the β-hydride elimination produces multiple polymer chains per catalytic site allowing for the production of large quantities of material.

In step 2, the selectivity of the metathesis reaction between olefins and acrylates quantitatively converts the polyolefins into macroinitiators. For example, one can leverage the power of a Grubbs cross metathesis reaction to activate both terminal and internal alkenes to generate a variety of end functionalized polyolefins, which can partake in various controlled reactions.

In step 3, the living coordinative Ring Opening Polymerization (cROP) of a cyclic ester monomer, anionic Ring Opening Polymerization (aROP) of an epoxide monomer, and Atom Transfer Radical Polymerization (ATRP) of a vinylic monomer are employed to quantitatively synthesize block copolymers and star-shaped polymers from polyolefin macroinitiators.

The quantitative conversion of polyolefins into block copolymers ensure that no homopolymer is generated, establishing the effectiveness of the transformation. See the Experimental section below (Section VI. *NMR Conversion Sensitivity Experiments*) for the meaning of "quantitative conversion."

Furthermore, as noted above in the Background section, commercial polyolefin block copolymers have been limited to apolar monomers. In contrast, the large range of apolar and polar monomers accessible by controlled polymerizations utilizing our this system makes it a powerful platform to generate a wide range of polyolefin containing materials. We also demonstrate the ability of these types of materials to form self-assembling microstructures in both thin films and in solution. In addition, we demonstrate the advantage of using exclusively catalytic reactions to synthesize olefin containing block copolymers by comparing the overall productivity of our process to previously reported strategies.

Step 1: Insertion Polymerization

An insertion polymerization reaction of an olefin monomer or a mixture of olefinic monomers can produce an alkenyl terminated polyolefin. A series of single site homogenous insertion catalysts were used to produce a polyolefin library containing HDPE, PP, LLDPE, HBPE and isoPP (See Chart 1 below). See D. Zhang, D. Guironnet, I. Göttker-Schnetmann, S. Mecking, *Organometallics* 2009, 28, 4072-4078; D. Guironnet, T. Rünzi, I. Göttker-Schnetmann, S. Mecking, *Chem. Commun.* 2008, 4965-4967; A. E. Cherian, E. B. Lobkovsky, G. W. Coates, *Macromolecules* 2005, 38, 6259-6268; L. K. Johnson, C. M. Killian, M. Brookhart, *J. Am. Chem. Soc.* 1995, 117, 6414-6415; and L. K. Johnson, C. M. Killian, M. Brookhart, *J. Am. Chem. Soc.* 1995, 117, 6414-6415, which are incorporated herein by reference. Two grades of HDPE were synthesized. Low molecular weight HDPE (l-HDPE) with an $M_n$ (NMR)=800 g/mol was produced from a phosphinosulfonate nickel catalyst, and serves as a model system since there is a high concentration of end-groups which eases the characterization of the product by NMR spectroscopy. While a higher molecular weight semi-crystalline HDPE (h-HDPE), $M_n$ (GPC)=18,000 g/mol, with an industrially relevant melting temperature ($T_m$=132° C.) was produced from a phosphinosulfonate palladium complex. h-HDPE was implemented to show that the methodology is quantitative for various molecular weights and for a variety of polymerization catalysts. A bis(phenoxyimine)titanium dichloride catalyst was implemented to synthesize the stereoselective synPP and LLDPE. A Pd-diimine catalyst was used to produce amorphous HBPE with a comparatively higher molecular weight of $M_n$=89,000 g/mol. The molecular structure of this polymer makes it soluble at room temperature in most organic solvents, which is advantageous for the characterization of the material as the low concentration of the end-group makes it otherwise challenging. Finally, an indenyl zirconium metallocene catalyst was used to produce isoPP.

Chart 1. Polyolefin Library

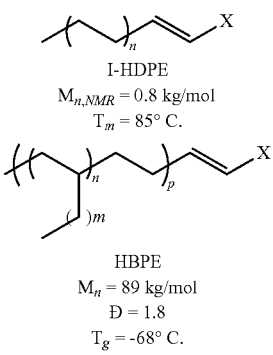

l-HDPE
$M_{n,NMR}$ = 0.8 kg/mol
$T_m$ = 85° C.

HBPE
$M_n$ = 89 kg/mol
Đ = 1.8
$T_g$ = -68° C.

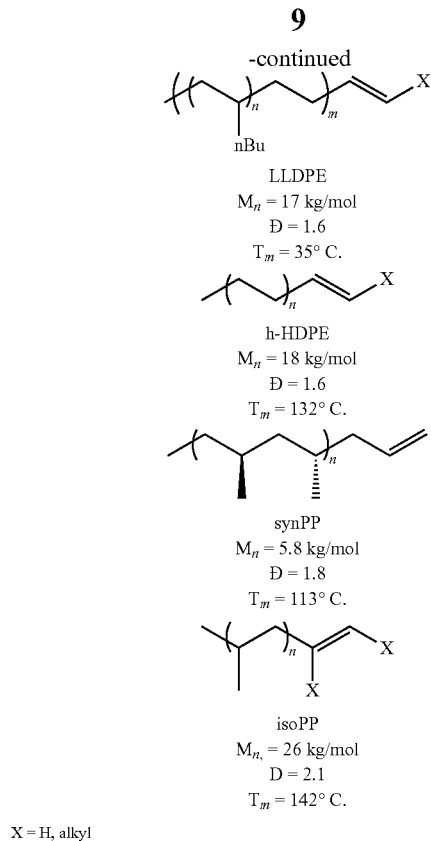

-continued

LLDPE
$M_n$ = 17 kg/mol
Đ = 1.6
$T_m$ = 35° C.

h-HDPE
$M_n$ = 18 kg/mol
Đ = 1.6
$T_m$ = 132° C.

synPP
$M_n$ = 5.8 kg/mol
Đ = 1.8
$T_m$ = 113° C.

isoPP
$M_{n,}$ = 26 kg/mol
Đ = 2.1
$T_m$ = 142° C.

X = H, alkyl

In the chart, $M_n$ is NMR (noted) or GPC (not noted). Đ is $M_w/M_n$ (GPC). $T_m$ is DSC. The characterization of the polyolefin library is more fully described in the Experimental section below (Section II. Polyolefin Synthesis Procedure).

Step 2: Cross Coupling

Figure 3:
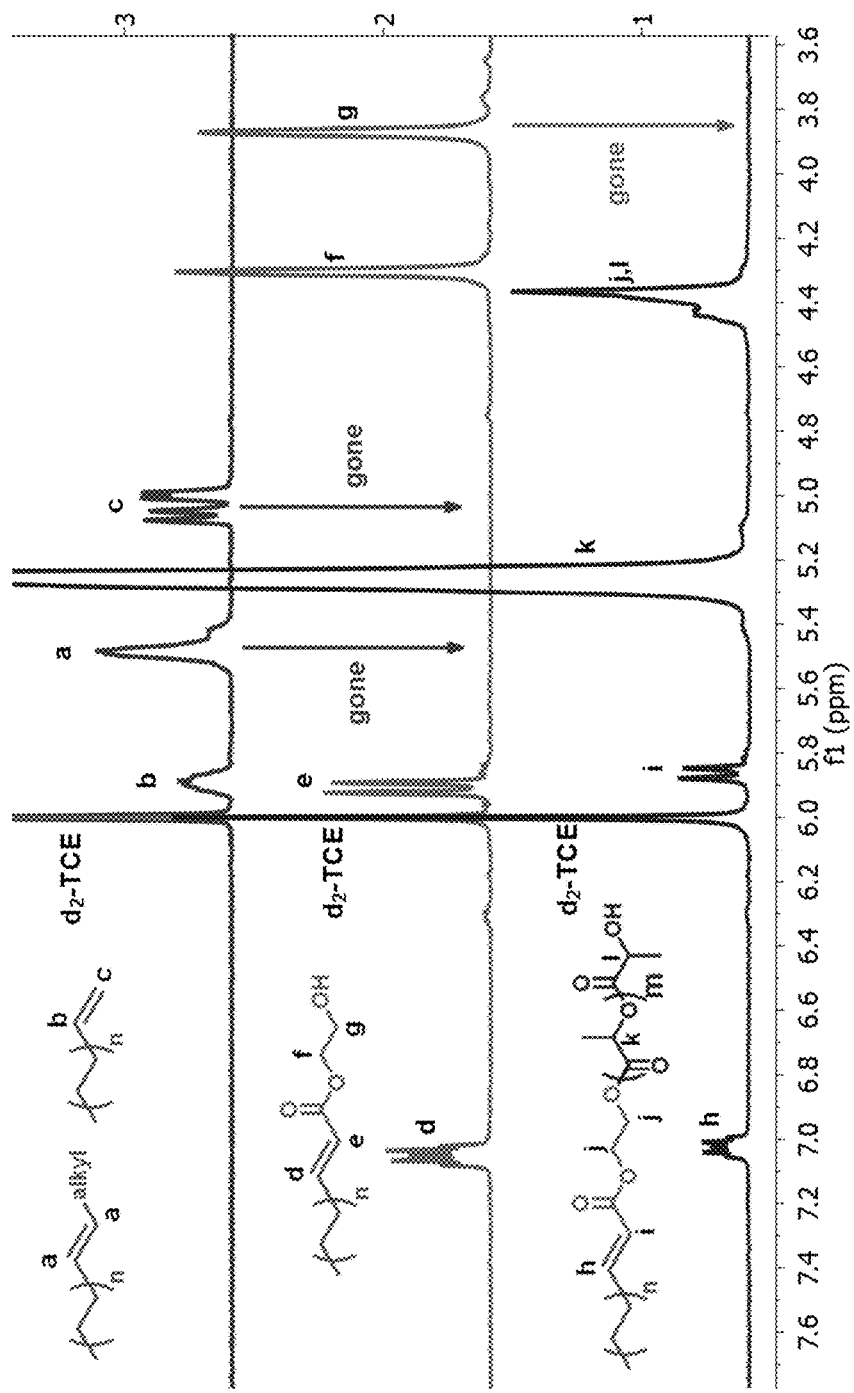
FIG. 3. $^1$H NMR for l-HDPE after cross methathesis.

As recently illustrated by Mecking et al. (T. Wiedemann, G. Voit, A. Tchernook, P. Roesle, I. Göttker-Schnetmann, S. Mecking, J. Am. Chem. Soc. 2014, 136, 2078-2085), which is incorporated herein by reference, implementing ruthenium catalyzed cross coupling metathesis represents an efficient approach to functionalizing amorphous polyolefins. However, in order to implement cross coupling metathesis for the functionalization of a full library of polyolefins, it was advantageous to identify reaction conditions compatible with the elevated temperatures (e.g., 120° C.) needed to solubilize semi-crystalline polyolefins. A Hoveyda-Grubbs II catalyst (HG-catalyst) is described in S. B. Garber, J. S. Kingsbury, B. L. Gray, A. H. Hoveyda, J. Am. Chem. Soc. 2000, 122, 8168-8179, which is incorporated herein. We found that by adding 1 mol % of a HG-catalyst simultaneously with a cross coupling partner, 2-hydroxyethyl acrylate (HEA) or 2-(2-bromoisobutyryloxy) ethyl acrylate (BIEA), over 30 minutes was highly effective for converting l-HDPE end groups. Slow feeding of the olefin metathesis catalyst was utilized to thwart its thermal deactivation. FIG. 3 presents the ¹H NMR for l-HDPE after cross methathesis, illustrating quantitative conversion of both terminal (5.9 ppm and 5.0 ppm) and internal olefins (5.5 ppm).

Next, we applied similar reaction conditions to the full library of polyolefins with only minor adjustments to HEA feed procedure depending on the ratio of internal to terminal double bonds present. Quantitative conversions of the polyolefin double bonds were achieved for all cross coupling reactions of the polyolefins as determined by ¹H NMR (See Table 1 below). The absence of internal olefinic double bonds in the ¹H NMR spectrum at 5.5 ppm confirmed that no polyolefin homo-polymer remained. The original polyolefins may participate in homo-coupling, but the homo-coupling product will be easily re-activated and eventually be paired with HEA. Moreover, acrylates are ideal coupling partners because electron deficient olefins are known to be slow at homodimerization. (See A. K. Chatterjee, T.-L. Choi, D. P. Sanders, R. H. Grubbs, J. Am. Chem. Soc. 2003, 125, 11360-11370, which is incorporated herein by reference.) Additionally, subjecting HEA to our reaction conditions did not result in any homo-coupling product formation.

TABLE 1

Cross Metathesis

| entry[a] | polyolefin | acrylate | conv. (%)[b] | $M_n$ (kDa)[c] | Đ[c] |
|---|---|---|---|---|---|
| 1-1 | l-HDPE | | Quant | 0.9[d] | —[e] |
| 1-2 | h-HDPE | | Quant | 19 | 1.5 |
| 1-3 | synPP | HEA | Quant | 5.5 | 1.8 |
| 1-4 | LLDPE | | Quant | 17 | 1.5 |
| 1-5 | HBPE | | Quant | 95 | 1.7 |
| 1-6 | l-HDPE | BIEA | Quant | 1.1[d] | —[e] |

[a]See Experimental section (section III) below for conditions.
[b]Determined from ¹H NMR of precipitated product.
[c]Determined from GPC or ht-GPC.
[d]Determined by NMR.
[e]Molecular weight too low for GPC analysis.

Step 3: Controlled Living Polymerization

HEA-functionalized polyolefins were used as macroinitiators for cROP of lactide and aROP of tert-butyl glycidyl ether (tBuGE), while BIEA functionalized HDPE was used to initiate the ATRP of styrene (See reaction scheme of FIG. 1). The implementation of controlled polymerizations ensures that all polyolefin chains are converted into block copolymers and that no homopolymer is formed. We performed the immortal cROP of lactide on l-HDPE, h-HDPE, synPP, LLPDE, and HBPE (See Table 2 below, entries 2-1 to 2-5). Sub-stoichiometric loadings of Sn(Oct)₂ were used to catalyze the cROP. Evidence of complete conversion of the macroinitiator was demonstrated by the total disappearance of the methylene protons adjacent to the hydroxyl group (3.8 ppm) in ¹H NMR (FIG. 3).

TABLE 2

Living Chain Growth Polymerizations

| entry[a] | block copolymer | conv. (%)[b] | $f_a$[c] | $M_n$ (kDa)[d] | Đ[d] |
|---|---|---|---|---|---|
| 2-1 | l-HDPE-PLA | Quant. | 0.54 | 4.2 | 1.4 |
| 2-2 | h-HDPE-PLA | Quant. | 0.47 | 69 | 1.3 |
| 2-3 | synPP-PLA | Quant. | 0.58 | 15 | 1.6 |
| 2-4 | LLDPE-PLA | Quant. | 0.72 | 29 | 1.2 |
| 2-5 | HBPE-PLA | Quant. | 0.84 | 170 | 1.8 |
| 2-6 | l-HDPE-PS | Quant. | 0.46 | 5.0 | 1.1 |
| 2-7 | l-HDPE-P(tBuGE) | —[e] | 0.29 | 7.5 | 1.2 |

[a]See Experimental section below for conditions (section IV).
[b]Determined from ¹H NMR of precipitated product.
[c]Mole fraction of polyolefin.
[d]Determined from GPC or HT-GPC.
[e]Unable to determine due to overlaping signals in the ¹H NMR.

To further showcase the versatility of our approach, we performed ATRP of styrene resulting in quantitative conversion of BIEA functionalized l-HDPE to yield l-HDPE-PS block copolymer (Entry 2-6). Additionally, we carried out the immortal aROP of an epoxide monomer by using sub-stoichiometric amounts of KN(TMS)$_2$ (Entry 2-7). However, to successfully perform this anionic polymerization, it was advantageous to reduce the acrylate linker of 1-HDPE-HEA into a primary alcohol to avoid side reactions.

In various embodiments, the alkenyl terminated polyolefin of step (a) may have the structure of one of the following formulas:

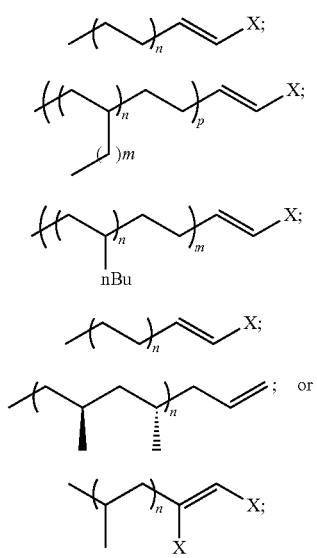

where X is H or linear or branched C$_{1-18}$ alkyl.

In embodiments of the catalytic cross metathesis reaction (step 2), the catalyst comprises a ruthenium based methathesis catalyst. In various embodiments, a ruthenium based methathesis catalyst and a cross-coupling compound are added to the olefin terminated polyolefin of step 1. In various embodiments, the cross-coupling compound comprises an acrylate. In certain embodiments, the cross-coupling compound comprises 2-hydroxyethyl acrylate (HEA), 2-(2-bromoisobutyryloxy) ethyl acrylate (BIEA) or 1-((2-bromo-2-methylpropanoyl)-3-hydroxypropan-2-yl acrylate.

In embodiments, the cyclic ester monomer comprises a lactide. In various embodiments, the cyclic ester monomer comprises polylactic acid (PLA) or caprolactone. In certain embodiments, the polyolefin-containing block copolymer comprises l-HDPE-PLA, h-HDPE-PLA, synPP-PLA, LLDPE-PLA, HBPE-PLA or iso-PP-PLA.

In one embodiment, the epoxide monomer comprises tert-butyl glycidyl ether (tBuGE).

In one embodiment, the vinylic monomer comprises styrene.

A broad and diverse pool of catalysts may be utilized in any step of our methodology. Conventional catalysts for polymerization may be employed, such as Ziegler-Natta catalysts, Phillips catalysts and Grubbs catalysts (1$^{st}$, 2$^{nd}$ or 3$^{rd}$ generation). For example, a catalyst may comprise nickel, titanium, palladium, zirconium, iron, hafnium, cobalt, vanadium, chromium, aluminum, organoaluminium, magnesium, metallocene, tin, zinc, cobalt, indium, potassium, or multidentate oxygen- and nitrogen-based ligands.

In embodiments of insertion polymerization (step 1), catalysts may comprise nickel, titanium, palladium, zirconium, iron, hafnium, cobalt, vanadium or chromium.

In embodiments of the cROP reaction of a cyclic ester monomer (step 3), catalysts may comprise tin, aluminum, zirconium, zinc, cobalt or indium.

In embodiments of the the aROP reaction of an epoxide monomer (step 3), the polyolefin macroinitiator of step 2 is first hydrogenated before running the reaction. In various embodiments, the (hydrogenated) polyolefin macroinitiator is reduced to a primary alcohol with a reducing agent prior to running the aROP reaction of an epoxide monomer. In one embodiment, the aROP reaction of an epoxide monomer is catalyzed with KN(TMS)$_2$.

Star-Shaped Polymers

Figure 4:
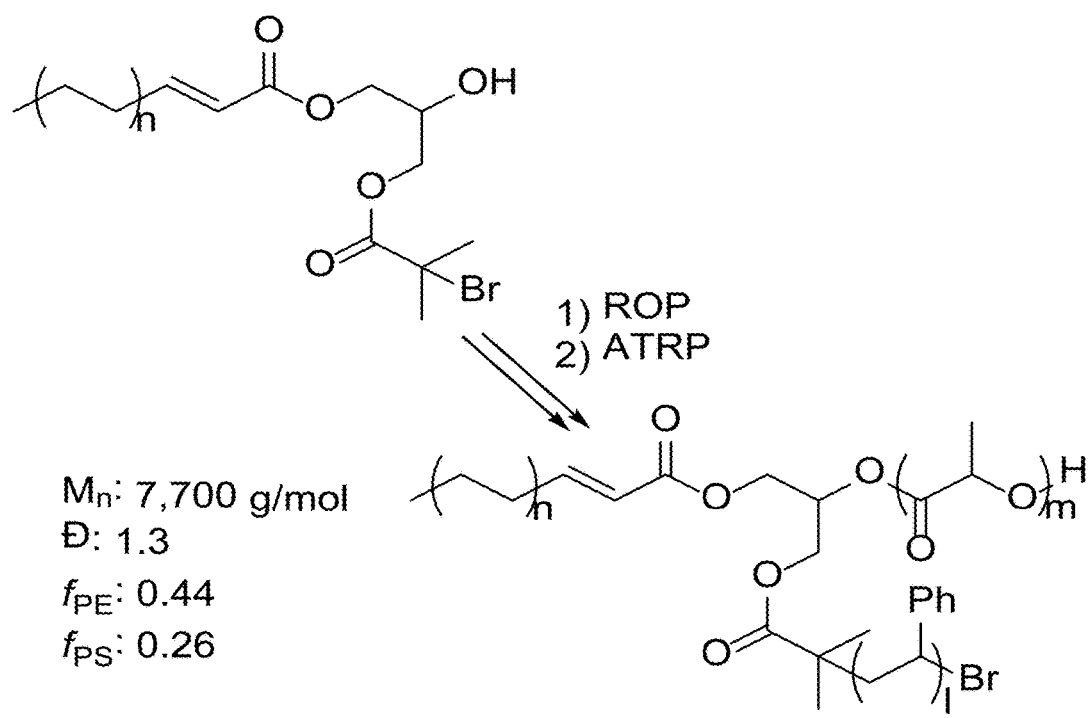
FIG. 4. Synthesis of a 3-miktoarm star-shaped polymer.

More advanced architectures can be achieved beyond basic diblock copolymers with this methodology. One example is the synthesis of a 3-miktoarm star-shaped polymer (FIG. 4). Star polymers have gained attention for their unique ability to yield highly asymmetric lamellae domains, which are not accessible by linear diblock copolymers. By cross coupling a polyolefin to a dual initiating coupling partner, such as one that contains an alcohol and 2-bromoisobutyrate functionality, both cROP of lactide and ATRP of styrene can be performed resulting in a 1-HPDE-PLA-PS 3-miktoarm star (FIG. 4). Efficient synthesis of the 3-arm star has been demonstrated by the observance of an increase in molecular weight as determined by GPC after each step.

While only employing minor optimization of the reaction conditions, we were still able to achieve an overall productivity of 20,000 g of polymer per gram of metal, which is over one order of magnitude more productive than previously reported systems. Furthermore, this significant gain in productivity could be further improved by applying the methodology to isotactic polypropylene made from a metallocene catalyst. Indeed, the high productivity of the catalyst enabled us to achieve an overall productivity of 125,000 grams of polymer per gram of metal for the synthesis of isoPP-PLA with a mole fraction of 0.50 and a M$_n$=71 kg/mol. To put the numbers into perspective, industrially produced polypropylene is predominantly made with Ziegler-Natta catalysts, which produces 600,000 grams of polymer per gram of metal.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention. While the present disclosure can take many different forms, for the purpose of promoting an understanding of the principles of the disclosure, reference will now be made to the embodiments illustrated in the examples and figures, and specific language will be used to describe the same. It will nevertheless be understood that no limitation of the scope of the disclosure is thereby intended. Any alterations and further modifications of the described embodiments, and any further applications of the principles of the disclosure as described herein are contemplated as would normally occur to one skilled in the art to which the disclosure relates. Every formulation or combination of components described or exemplified herein can be used to practice the disclosure, unless otherwise stated.

The specific embodiments provided herein are examples of useful embodiments of the present disclosure and it will be apparent to one skilled in the art that the present disclosure may be carried out using a large number of variations of the devices, device components, methods and steps set forth in the present description. As will be readily apparent to one of skill in the art, methods and devices useful for the present methods can include a large number of optional composition and processing elements and steps.

One of ordinary skill in the art will appreciate that starting materials, biological materials, reagents, synthetic methods, purification methods, analytical methods, assay methods, and biological methods other than those specifically exemplified can be employed in the practice of the disclosure without resort to undue experimentation. All art-known functional equivalents, of any such materials and methods are intended to be included in this disclosure. The terms and expressions that have been employed are used as terms of description and not of limitation, and there is no intention that in the use of such terms and expressions of excluding any equivalents of the features shown and described or portions thereof, but it is recognized that various modifications are possible within the scope of the disclosure. Thus, it should be understood that although the present disclosure has been specifically disclosed by exemplary embodiments and optional features, modification and variation of the concepts herein disclosed may be resorted to by those skilled in the art, and that such modifications and variations are considered to be within the scope of this disclosure as defined by the claims.

The spirit and scope of the appended aspects should not be limited, therefore, to the description of the exemplary embodiments contained herein. All embodiments that come within the meaning of the aspects, either literally or by equivalence, are intended to be embraced therein. Furthermore, the advantages described above are not necessarily the only advantages of the disclosure, and it is not necessarily expected that all of the described advantages will achieved with every embodiment of the disclosure.

Examples

I. General Methods and Materials

All reactions were carried out using oven-dried glassware under an argon atmosphere and utilized dried solvents (toluene, DCM, THF) unless otherwise noted. The following commercially obtained reagents were used as received: 2-Hydroxyethyl Acrylate (HEA, Aldrich, contains 200-650 ppm monomethyl ether hydroquinone as inhibitor), tert-Butyl glycidyl ether (tBuGE, Aldrich), Diethylene Glycol Dimethyl Ether (Diglyme, TCI America), Ethylene (Airgas, Research Plus), Propylene (Airgas, electronic grade), Copper(I) bromide (CuBr, Aldrich, 99.999% trace metals basis), N,N,N',N'',N''-pentamethyldiethylenetriamine (PMDETA, Aldrich), Hoveyda-Grubbs Catalyst 2nd Generation (HG-catalyst, Materia Inc), Potassium bis(trimethylsilyl)amide (KN(TMS)$_2$, Aldrich), 1-hexene (Aldrich), Dichloro[rac-ethylenebis(indenyl)]zirconium(IV) (Aldrich). A 7 wt % aluminum methylaluminoxane (MAO) solution was purchased from Aldrich and concentrated to yield a white solid prior to use (known as "Dried MAO").

2-(2-Bromoisobutyryloxy) ethyl acrylate (BIEA) was synthesized following literature procedure. See K. Matyjaszewski, S. G Gaynor, A. Kulfan, M. Podwika, *Macromolecules* 1997, 30, 5192-5194, which is incorporated herein by reference.

Low molecular weight high density polyethylene (l-HDPE) catalyst (dinickel methyl diamine phosphinesulfonate complex) was synthesized according to the literature. See D. Guironnet, T. Rünzi, I. Göttker-Schnetmann, S. Mecking, *Chem. Commun.* 2008, 4965-4967, which is incorporated herein by reference.

High molecular weight high density polyethylene (h-HDPE) catalyst (Palladium methyl phosphinesulfonate complex) was synthesized according to the literature. See D. Zhang, D. Guironnet, I. Göttker-Schnetmann, S. Mecking, *Organometallics* 2009, 28, 4072-4078, which is incorporated herein by reference.

Syndiotatic polypropylene (synPP) and linear low density polyethylene (LLDPE) catalyst (methylaluminoxane-activated bis(phenoxyimine)titanium dichloride) were synthesized according to the literature. See A. E. Cherian, E. B. Lobkovsky, G W. Coates, *Macromolecules* 2005, 38, 6259-6268, which is incorporated herein by reference.

Hyperbranched polyethylene (HBPE) catalyst (palladium diimine complex) was synthesized according to literature. See L. K. Johnson, C. M. Killian, M. Brookhart, *J. Am. Chem. Soc.* 1995, 117, 6414-6415, which is incorporated herein by reference.

Rac-lactide was purchased from Aldrich and recrystallized 6 times from dry toluene and dried under reduced pressure (0.01 mm Hg) with P$_2$O$_5$ for 2 days prior to use. Stabilized styrene was purchased from Acros and passed over a neutral aluminum oxide plug prior to use. Stannous octoate (Sn(Oct)$_2$, Aldrich) was distilled under reduced pressure (0.01 mm Hg) and stored in a glovebox prior to use.

NMR spectra were recorded on a Varian Unity 500 MHz, Varian Unity Inova NMR 600 MHz or Bruker AVANCE III 500 MHz spectrometer and are reported in ppm using the following solvents as an internal standards: CDCl$_3$ ($^1$H 7.26 ppm and $^{13}$C 77.2 ppm), DCl$_2$CCCl$_2$D (d$_2$-TCE) ($^1$H 6.00 ppm and $^{13}$C 73.78 ppm). When d$_2$-TCE was employed, Cr(acac)$_2$ was added to aid in reducing relaxation times. The differential scanning calorimetry (DSC) measurement was performed using TA Instrument Q20. Tzero aluminum pans and lids were used as sample testing containers. Polymer crystallinities were calculated based on a melt enthalpy of 294 J/g for 100% crystalline polyethylene and a melt enthalpy of 207 J/g for 100% crystalline polypropylene. Gel Permeation Chromatography (GPC) was performed using a Tosoh Ecosec HLC-8320GPC at 40° C. fitted with a reference column (6.0 mm ID×15 cm), a guard column (6.0 mm ID×4.0 cm×5 μm), and two analytical columns (7.8 mm ID×30 cm×5 μm). The reference flow rate is 0.5 mL/min while the analytical column is at 1.0 mL/min. THF (HPLC grade) was used as the eluent, and polystyrene standards (15 points ranging from 500 Mw to 8.42 million Mw) were used for calibration. High temperature gel permeation chromatography (GPC) was performed at 160° C. in 1,2,4-trichlorobenzene at a flow rate of 1.0 mL/min on a Malvern Viscotek HT-GPC equipped with triple detection. Absolute molecular weights were calculated from do/dc values assuming 100% mass recovery.

II. Polyolefin Synthesis Procedure

A. Procedure for the Synthesis of Low Molecular Weight High Density Polyethylene (l-HDPE)

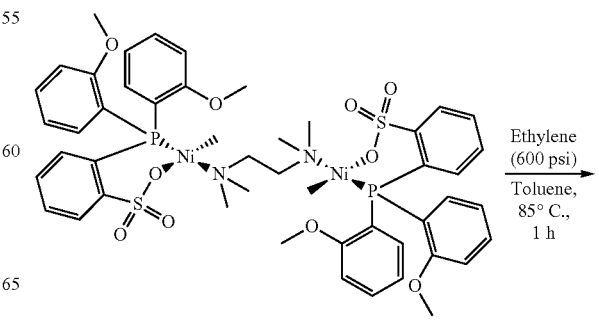

Ethylene (600 psi)

Toluene, 85° C., 1 h

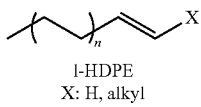

l-HDPE
X: H, alkyl

This procedure was adopted from the literature. See D. Guironnet, T. Rünzi, I. Göttker-Schnetmann, S. Mecking, *Chem. Commun.* 2008, 4965-4967, which is incorporated herein by reference.

The polymerization was carried out in a mechanically stirred (1000 rpm) high-pressure stainless steel reactor equipped with a heating and cooling jacket, thermocouple. To run the polymerization, the reactor was cleaned with detergent, rinsed with excess water, and heated under vacuum for ~1 h at 85° C. The reactor was backfilled with argon. Three more quick cycles of vacuum-and-backfilling with argon were repeated before the transfer of degassed toluene (100 ml) at 60° C. Dinickel methyl diamine phosphinesulfonate complex (10 mg, 7.8 μmol) was transferred into the reactor and pressurized to 600 psi with ethylene. The temperature was uncontrolled, rising significantly, before returning back to 60° C. within 5 min. After 30 min. of polymerization, the ethylene was vented quickly and the polymer solution was poured hot into excess methanol. The resulting precipitates were collected by filtration. The solid polymer was dried under vacuum at 50° C. overnight to yield a white polymer.

Yield=68 g, fraction of terminal double bonds (NMR)=0.43, $M_n$ (NMR)=800 g/mol, $T_m$ (DSC)=85° C.

Procedure for the Synthesis of High Molecular Weight High Density Polyethylene (h-HDPE)

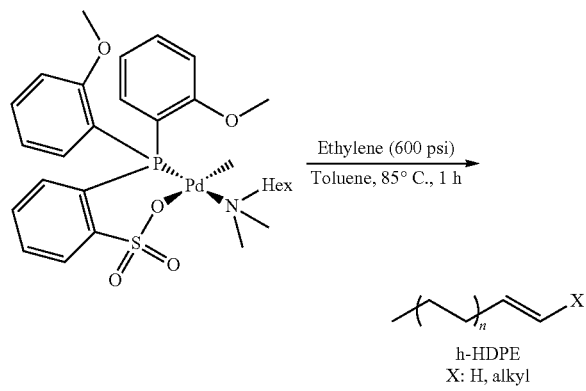

h-HDPE
X: H, alkyl

This procedure was adopted from the literature. See D. Zhang, D. Guironnet, I. Göttker-Schnetmann, S. Mecking, *Organometallics* 2009, 28, 4072-4078, which is incorporated herein by reference.

The polymerization was carried out in a mechanically stirred (1000 rpm) high-pressure stainless steel reactor equipped with a heating and cooling jacket, thermocouple. The temperature was controlled within 5° C. of the polymerization via a thermocouple dipped into the polymerization mixture. To run the polymerization, the reactor was cleaned with detergent, rinsed with excess water, and heated under vacuum for ~1 h at 85° C. The reactor was backfilled with argon. Three more quick cycles of vacuum-and-backfilling with argon were repeated before the transfer of degassed toluene (100 ml) at 85° C. Palladium methyl phosphinesulfonate complex (4 mg, 6.0 μmol) was transferred into the reactor and pressurized to 600 psi at 85° C. The temperature was controlled using a thermocouple dipped into the reaction mixture. After one hour of polymerization, the ethylene was vented quickly and the polymer solution was poured hot into excess methanol. The resulting precipitates were collected by filtration. The solid polymer was dried under vacuum at 50° C. overnight to yield a white polymer.

Yield=5.5 g, fraction of terminal double bonds (NMR)=0.83, $M_n$ (NMR)=16,000 g/mol, $M_n$ (GPC)=18,000 g/mol, $M_w/M_n$(GPC)=1.6, $T_m$ (DSC)=132° C., % crystallinity=57%.

Procedure for the Synthesis of Syndiotactic Polypropylene (synPP)

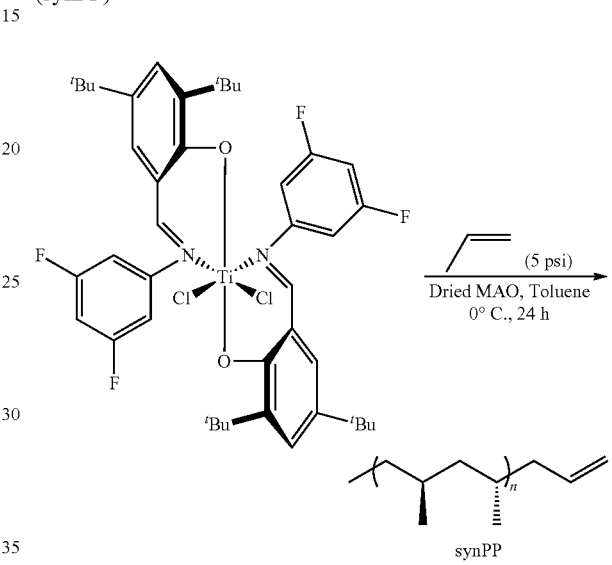

synPP

This procedure was adopted from the literature. See A. E. Cherian, E. B. Lobkovsky, G. W. Coates, *Macromolecules* 2005, 38, 6259-6268, which is incorporated by reference.

The polymerization was carried out in a mechanically stirred (1000 rpm) low-pressure glass reactor equipped with a heating and cooling jacket, thermocouple. To run the polymerization, the reactor was cleaned with detergent, rinsed with excess water, and heated under vacuum for ~6 h at 50° C. The reactor was backfilled with argon. Three more quick cycles of vacuum-and-backfilling with argon were repeated before the transfer of a solution of degassed toluene (140 ml) and dried MAO (580 mg, 10 mmol) into the reactor. The solution was then cooled to 0° C. and pressured with propylene (5 psi) and vented 3 times, allowing for equilibration time (5 min) before venting. A solution of bis(phenoxyimine)titanium dichloride (40.4 mg, 0.05 mmol) in toluene (10 ml) was transferred into the reactor and re-pressurized to 5 psi quickly. The temperature was maintained at 0° C. for 24 h at which time the propylene was quickly vented and the polymer solution was poured into excess acidic methanol, and the resulting precipitates were collected by filtration. The solid polymer was dried under vacuum at 50° C. overnight to yield a white polymer.

Yield=6.6 g, fraction of terminal double bonds (NMR)=0.99, $M_n$ (NMR)=5,000 g/mol, $M_n$ (GPC)=5,800 g/mol, $M_w/M_n$ (GPC)=1.8, $T_m$ (DSC)=113° C., $T_g$ (DSC)=−13° C.

Procedure for Linear Low Density Polyethylene (LLDPE)

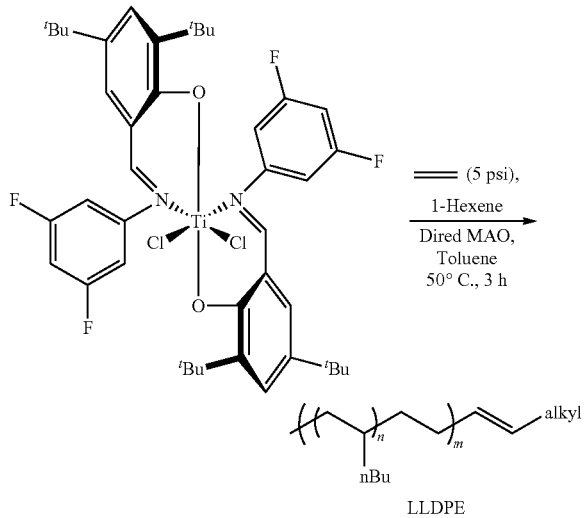

LLDPE

The polymerization was carried out in a mechanically stirred (1000 rpm) low-pressure glass reactor equipped with a heating and cooling jacket, thermocouple. To run the polymerization, the reactor was cleaned with detergent, rinsed with excess water, and heated under vacuum for ~6 h at 50° C. The reactor was backfilled with argon. Three more quick cycles of vacuum-and-backfilling with argon were repeated before the transfer of a solution of degassed 1-hexene (100 ml) and dried MAO (290 mg, 5 mmol) into the reactor. The solution was then heated to 50° C. and pressured with ethylene (5 psi) and vented 3 times, allowing for equilibration time (5 min) before venting. A solution of bis(phenoxyimine)titanium dichloride (20.2 mg, 0.025 mmol) in toluene (10 ml) was transferred into the reactor and re-pressurized to 5 psi quickly. The temperature was maintained at 50° C. for 3 h at which time the ethylene was vented and the polymer solution was poured into excess acidic methanol, and the resulting precipitates were collected by filtration. The solid polymer was dried under vacuum at 50° C. overnight to yield a white polymer.

Yield=8.4 g, fraction of terminal double bonds (NMR)=>0.01, mole fraction of hexene: 0.15, $M_n$ (NMR) =14,000 g/mol, $M_n$ (GPC)=17,000 g/mol, $M_w/M_n$(GPC) =1.6, $T_m$ (DSC)=35° C.

Procedure for the Synthesis of Hyperbranched Polyethylene (HBPE)

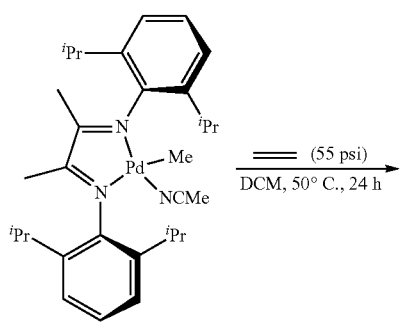

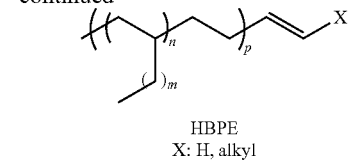

HBPE
X: H, alkyl

This procedure was adopted from the literature. See L. K. Johnson, C. M. Killian, M. Brookhart, *J. Am. Chem. Soc.* 1995, 117, 6414-6415, which is incorporated herein by reference.

The polymerization was carried out in a mechanically stirred (1000 rpm) low-pressure glass reactor equipped with a heating and cooling jacket, thermocouple. To run the polymerization, the reactor was cleaned with detergent, rinsed with excess water, and heated under vacuum for ~6 h at 50° C. The reactor was backfilled with argon. Three quick more cycles of vacuum-and-backfilling with argon were repeated before the transfer of a solution of palladium diimine complex (77.1 mg, 0.05 mmol) in degassed DCM (50 ml). The solution was then allowed to equilibrate at 50° C. before being pressured with ethylene (55 psi). The temperature was maintained at 50° C. for 24 h at which time the ethylene was vented and the polymer solution was dried under vacuum at 50° C. overnight. The remaining residual was re-dissolved into pentane and passed through a silica plug. The resulting solution was dried under vacuum at 50° C. for 5 days to yield a colorless polymer.

Yield=27 g, fraction of terminal double bonds (NMR)=0.19, $M_n$ (NMR)=83,000 g/mol, $M_n$ (GPC)=89,000 g/mol, $M_w/M_n$ (GPC)=1.8, $T_g$ (DSC)=−68° C.

B. Procedure for the Synthesis of Isotactic Polypropylene (isoPP)

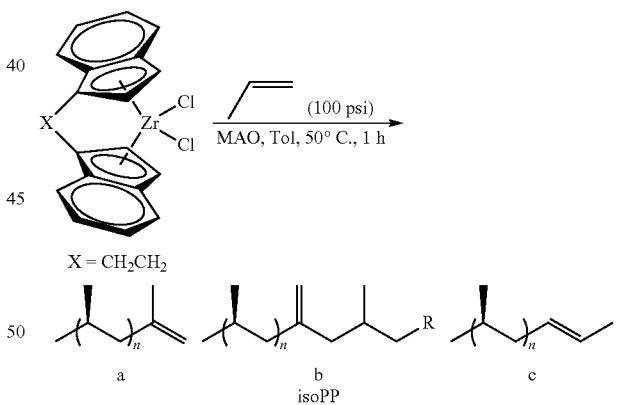

isoPP

This procedure was adopted from the literature. See L. Resconi, F. Piemontesi, I. Camurati, O. Sudmeijer, I. E. Nifant'ev, P. V. Ivchenko, L. G. Kuz'mina, *J. Am. Chem. Soc.* 1998, 120, 2308-2321, which is incorporated herein by reference.

The polymerization was carried out in a mechanically stirred (1000 rpm) glass reactor equipped with a heating and cooling jacket, thermocouple. To run the polymerization, the reactor was cleaned with detergent, rinsed with excess water, and heated under vacuum for ~6 h at 50° C. The reactor was backfilled with argon. Three more quick cycles of vacuum-and-backfilling with argon were repeated before the transfer of a solution of degassed toluene (140 ml) and dried MAO (140 mg, 2.4 mmol) into the reactor. The solution was then heated to 50° C. and pressured with propylene (100 psi) and vented 3 times, allowing for equilibration time (15 min) before venting. A solution of dichloro[rac-ethylenebis(indenyl)]zirconium(IV) (0.25 mg, 0.6 µmol) in toluene (10 ml) was generated and added to a vial with dried MAO (140 mg, 2.4 mmol). This mixture was allowed to react for 5 min. before injecting into the pressurized reactor. The temperature was maintained at 50° C. for 1 h at which time the propylene was vented and the polymer solution was poured into excess acidic methanol/diethyl ether (50% vol), and the resulting precipitates were collected by filtration. The collected solid was re-dissolved in boiling toluene and precipitated two more times. The solid polymer was then dried under vacuum at 50° C. overnight to yield a white polymer.

Yield=24.8 g, fraction of a (NMR)=0.24, fraction of b (NMR)=0.06, fraction of c (NMR)=0.70, $M_n$ (NMR)=27,000 g/mol, $M_n$ (GPC)=26,000 g/mol, $M_w/M_n$ (GPC)=2.1, $T_m$ (DSC)=142° C., % crystallinity=40%.

III. Cross Coupling Procedure

A. Procedure for Synthesis of 3 Arm Star Coupling Partner

J. Lloyd, P. Wilson, Q. Zhang, D. M. Haddleton, *Macromolecules* 2016, 49, 483-489, which is incorporated herein by reference.

A portion of the crude mixture (5 g, 20.8 mmol) obtained above was dissolved in dried and degassed DCM (80 ml) and trimethylamine (2.32 ml, 16.7 mmol). The mixture was cooled to 0° C. and a solution of acryloyl chloride (0.84 ml, 10.4 mmol) and DCM (10 ml) was added dropwise over 1 h. (A sub-stoichiometric amount of acryloyl chloride was used to avoid the double substituted product.) After the addition of acryloyl chloride, the reaction mixture was stirred for 12 h at room temperature. Mequinol (MEHQ) was added at this point to avoid spontaneous polymerization during workup and storage. The mixture was diluted with DCM and washed with a saturated solution of sodium bicarbonate. The organic layer was dried over $MgSO_4$, filtered, and concentrated. A colorless oil was obtained.

Yield=5.1 g. The product was stored at 0° C. and used as is for cross coupling reactions.

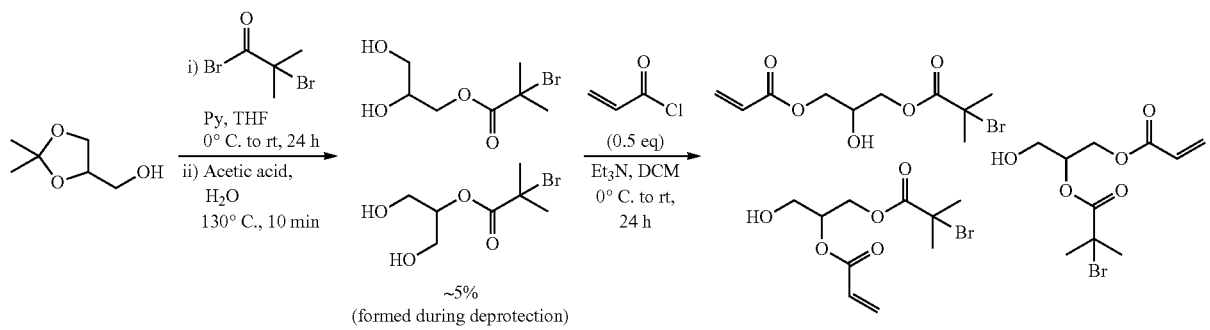

This procedure was adopted from the literature. See R. Villard, F. Fotiadu, G. Buono, *Tetrahedron: Asymmetry* 1998, 9, 607-611; K. Mori, *Tetrahedron* 2014, 70, 5752-5762; and J.-Z. Chen, Q.-L. Zhao, L.-P. Shi, J. Huang, G.-Y. Li, S.-Y. Zhang, Z. Ma, *J. Polym. Sci. Part A Polym. Chem.* 2009, 47, 5671-5681; each of which is incorporated herein by reference.

A solution of solketal (8 g, 60 mmol), pyridine (9.7 ml, 120 mmol) and THF (120 ml) was generated and cooled to 0° C. 2-bromoisobutylryl (11.2 ml, 90 mmol) was added dropwise over 1 h at 0° C. Upon completion of the addition, the cooling bath was removed and the reaction was allowed to stir at room temperature for 12 h. The mixture was diluted with DCM and washed with a saturated solution of sodium bicarbonate. The organic layer was then concentrated. A solution of acetic acid (100 ml) and deionized water (13 ml) was added to the organic concentrate. The mixture was heated, open to air, at 130° C. for 10 minutes. The flask was then cooled quickly by placing the flask in a room temperature water bath. The solution was then concentrated in vacuo and diluted with toluene multiple times to aid in the removal of water and acetic acid. A colorless solid is obtained.

Yield=13.1 g, 54.6 mmol (91% yield). A mixture of two regio-isomers (5% of untargeted product) was observed and matched literature. See G. R. Jones, Z. Li, A. Anastasaki, D.

General Cross Coupling Procedure

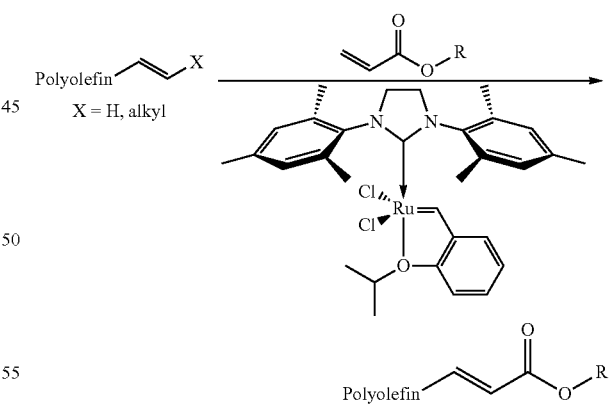

In a round bottom flask, polymer and toluene were mixed and heated to 120° C. until a homogeneous mixture was formed. (Warning: Since toluene's boiling point is 110° C., electrical tape was used to secure a rubber septum on-to the round bottom.) The solution was maintained at 120° C. and a syringe pump was utilized to simultaneously inject two different solutions over 30 mins. The first solution contained HG-catalyst dissolved in toluene. The second solution contained the coupling partner dissolved in toluene. After the addition, the mixture was heated at 120° C. for an additional 30 min before precipitating the polymer in methanol.

(i) l-HDPE-HEA
Polymer: 200 mg l-HDPE and 10 ml of toluene.
Catalyst solution: 1.6 mg of HG-catalyst and 0.5 ml of toluene.
Coupling solution: 290 mg HEA and 2 ml toluene.
Alteration: Precipitated in methanol/$H_2O$ (80/20) mixture.
Conversion of l-HDPE to l-HDPE-HEA (NMR): Quantitative*.
$M_n$ (NMR)=900 g/mol.
Note: Both 95% trans/5% cis was observed in $^1H$ NMR and identified based on the literature. See X. Meng, J. B. Matson, K. J. Edgar, *Polym. Chem.* 2014, 5, 7021-7033, which is incorporated herein by reference.

(ii) h-HDPE-HEA
Polymer: 1.5 g h-HDPE and 150 ml of toluene.
Catalyst solution: 0.5 mg of HG-catalyst and 0.5 ml of toluene.
Coupling solution: 97 mg HEA and 2 ml toluene.
Conversion of h-HDPE to h-HDPE-HEA (NMR): Quantitative*.
$M_n$ (NMR)=18,000 g/mol, $M_n$ (GPC)=19,000 g/mol, $M_w/M_n$ (GPC)=1.5.

(iii) synPP-HEA
Polymer: 1.5 g synPP and 15 ml of toluene.
Catalyst solution: 1.6 mg of HG-catalyst and 0.5 ml of toluene.
Coupling solution: 300 mg HEA and 2 ml toluene.
Alteration: All of the HEA was fully added prior to beginning 30 min addition of the catalyst solution.
Conversion of synPP to synPP-HEA (NMR): Quantitative*.
$M_n$ (NMR)=6,400 g/mol, $M_n$ (GPC)=5,500 g/mol, $M_w/M_n$ (GPC)=1.8.

(iv) LLDPE-HEA
Polymer: 1.5 g synPP and 15 ml of toluene.
Catalyst solution: 0.55 mg of HG-catalyst and 0.5 ml of toluene.
Coupling solution: 102 mg HEA and 2 ml toluene.
Conversion of LLDPE to LLDPE-HEA (NMR): Quantitative*.
$M_n$ (NMR)=15,000 g/mol, $M_n$ (GPC)=17,000, $M_w/M_n$ (GPC)=1.5.

(v) l-HDPE-BIEA
Polymer: 800 mg l-HDPE and 25 ml of toluene
Catalyst solution: 6.3 mg of HG-catalyst and 0.5 ml of toluene.
Coupling solution: 2.7 g BIEA and 3.2 ml toluene.
Alteration: Precipitated in methanol/$H_2O$ (80/20) mixture.
Conversion of l-HDPE to l-HDPE-BIEA (NMR): Quantitative*.
$M_n$ (NMR)=1,100 g/mol.

(vi) l-HDPE-3 Arm Linker
Polymer: 380 mg l-HDPE and 20 ml of toluene.
Catalyst solution: 3.0 mg of HG-catalyst and 0.5 ml of toluene.
Coupling solution: 1.5 g 3 arm linker and 3.2 ml toluene.
Alteration: Precipitated in methanol/$H_2O$ (80/20) mixture.
Conversion of l-HDPE to l-HDPE-3 arm linker: Quantitative*.
$M_n$ (NMR)=1,300 g/mol.

*The meaning of "quantitative conversion" is discussed below (Section VI. *NMR Conversion Sensitivity Experiments*).

(vii) isoPP-HEA
Polymer: 600 mg isoPP and 14 ml of toluene.
Catalyst solution: 15 µg of HG-catalyst and 0.5 ml of toluene.
Coupling solution: 5 mg HEA and 0.5 ml toluene.
Conversion of isoPP to isoPP-HEA (NMR): 70%.
$M_n$ (NMR)=30,000 g/mol, $M_n$ (GPC)=29,000 g/mol, $M_w/M_n$ (GPC)=2.0.

B. Procedure for Cross Coupling of HBPE

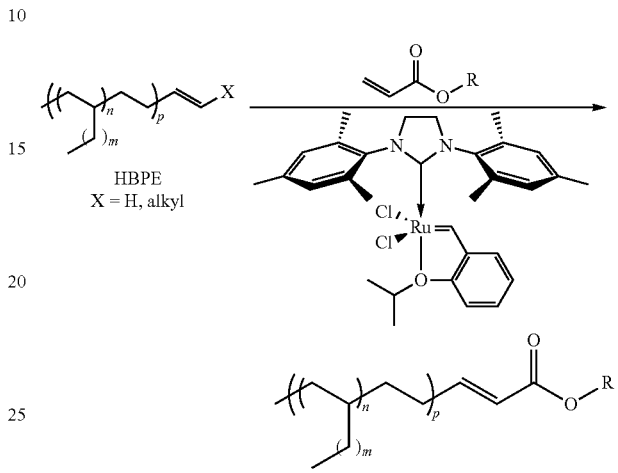

This procedure was adopted from the literature. See T. Wiedemann, G. Voit, A. Tchernook, P. Roesle, I. Göttker-Schnetmann, S. Mecking, *J. Am. Chem. Soc.* 2014, 136, 2078-2085, which is incorporated herein by reference.

In a vial, HBPE (2 g), HG-catalyst (0.14 mg), HEA (26 mg) and toluene (15 ml) were mixed and heated at 80° C. for 24 h. The mixture was then cooled to room temperature and passed through a plug of silica gel. The remaining solution was concentrated (80° C., 0.1 mm Hg, 5 days yielding a colorless oil.

Conversion of HBPE to HBPE-HEA (NMR): Quantitative*, $M_n$ (NMR)=93,000 g/mol, $M_n$ (GPC)=95,000 g/mol, $M_w/M_n$ (GPC)=1.7.

*The meaning of "quantitative conversion" is discussed below (Section VI. *NMR Conversion Sensitivity Experiments*).

Procedure for Cross Coupling, Hydrogenation and Reduction of l-HDPE

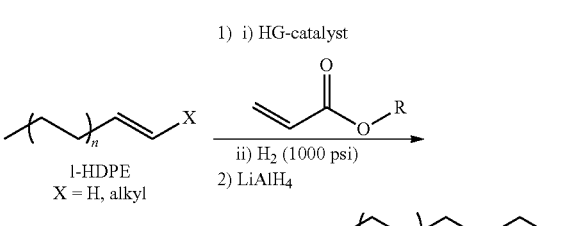

This procedure was adopted from the literature. See T. Wiedemann, G. Voit, A. Tchernook, P. Roesle, I. Göttker-Schnetmann, S. Mecking, *J. Am. Chem. Soc.* 2014, 136, 2078-2085, which is incorporated herein by reference.

In a mechanically stirred (1000 rpm) high-pressure stainless steel reactor, l-HDPE (4 g) and toluene (100 ml) were added and heated to 120° C. until a homogeneous mixture was formed. The solution was maintained at 120° C. and a syringe pump was utilized to simultaneously inject two different solutions over 30 mins. The first solution contained HG-catalyst (31 mg) dissolved in toluene (5 ml). The second solution contained the HEA (5.8 g) dissolved in toluene (20 ml). After the addition, the mixture was heated at 120° C. for an additional 30 min. The reactor was then pressurized to 1000 psi of hydrogen gas and stirred at 120° C. for 12 h. The hydrogen was quickly vented and the flask was cooled down. The polymer solution was poured into excess methanol, and the resulting precipitates were collected by filtration. The solid polymer was dried under vacuum at 50° C. overnight to yield a white polymer.

Polymer, lithium aluminum hydride (840 mg) and toluene (80 ml) were added into a flask and heated to 120° C. After 6 hours, water was slowly added to quench the reaction. The mixture was filtered hot and the polymer was precipitated in acidic methanol. The resulting precipitates were collected by filtration and was dried under vacuum at 50° C. overnight to yield a white polymer.

Conversion of l-HDPE to l-HDPE-OH (NMR): Quantitative*, $M_n$ (NMR)=1,000 g/mol.

*The meaning of "quantitative conversion" is discussed below (Section VI. *NMR Conversion Sensitivity Experiments*).

IV. Living Chain Growth Procedures

A. General Procedure for Coordinative Ring Opening Polymerization of Lactide

Number fraction of polyolefin (NMR): 0.47.
$M_n$ (NMR)=65,000 g/mol, $M_n$ (GPC)=69,000 g/mol, $M_w/M_n$ (GPC)=1.3.
(iii) synPP-PLA
Reagents: 150 mg synPP-HEA, 1.1 mg Sn(Oct)$_2$, 257 mg rac-lactide, 1 ml of toluene.
Conversion of synPP-HEA to synPP-PLA (NMR): Quantitative*.
Number fraction of polyolefin (NMR): 0.58.
$M_n$ (NMR)=14,000 g/mol, $M_n$ (GPC)=15,000 g/mol, $M_w/M_n$ (GPC)=1.6.
(iv) LLDPE-PLA
Reagents: 150 mg LLDPE-HEA, 0.36 mg Sn(Oct)$_2$, 297 mg rac-lactide, 3 ml of toluene.
Conversion of LLDPE-HEA to LLDPE-PLA (NMR): Quantitative*.
Number fraction of polyolefin (NMR): 0.72.
$M_n$ (NMR)=28,000 g/mol, $M_n$ (GPC)=29,000 g/mol, $M_w/M_n$ (GPC)=1.2.
(v) HBPE-PLA
Reagents: 200 mg HBPE-HEA, 0.1 mg Sn(Oct)$_2$, 515 mg rac-lactide, 1 ml of toluene.

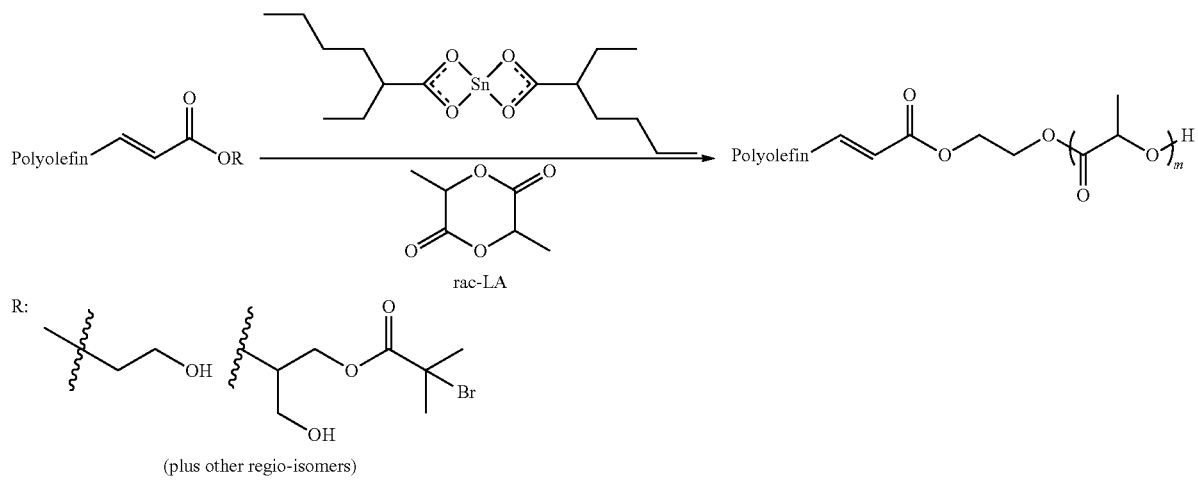

(plus other regio-isomers)

This procedure was adopted from the literature. See L. M. Pitet, M. a. Amendt, M. a. Hillmyer, *J. Am. Chem. Soc.* 2010, 132, 8230-8231, which is incorporated herein by reference. In a glass screw cap pressure vessel polymer, Sn(Oct)$_2$, lactide and toluene were mixed. The mixture was heated in an oil bath to 120° C. for 3 hours. The blend was then allowed to air cool to 110° C. and poured hot into a large excess of methanol. The resulting precipitates were collected by filtration and were dried under vacuum at 50° C. overnight to yield a white polymer.

(i) l-HDPE-PLA
Reagents: 200 mg l-HDPE-HEA, 9.0 mg Sn(Oct)$_2$, 514 mg rac-lactide, 2 ml of toluene.
Conversion of l-HDPE-HEA to l-HDPE-PLA (NMR): Quantitative*.
Number fraction of polyolefin (NMR): 0.54.
$M_n$ (NMR)=3,400 g/mol, $M_N$ (GPC)=4,200 g/mol, $M_w/M_n$ (GPC)=1.4.
(ii) h-HDPE-PLA
Reagents: 150 mg h-HDPE-HEA, 0.32 mg Sn(Oct)$_2$, 386 mg rac-lactide, 3 ml of toluene.
Conversion of h-HDPE-HEA to h-HDPE-PLA (NMR): Quantitative*.

Conversion of HBPE-HEA to HBPE-PLA (NMR): Quantitative*.
Number fraction of polyolefin (NMR): 0.84.
$M_n$ (NMR)=220,000 g/mol, $M_n$ (GPC)=170,000 g/mol, $M_w/M_n$ (GPC)=1.8.
(vi) l-HDPE-PLA-Br
Reagents: 150 mg l-HDPE-3 arm linker, 4.7 mg Sn(Oct)$_2$, 386 mg rac-lactide, 3 ml of toluene.
Conversion of l-HDPE-3 arm linker to l-HDPE-PLA-Br (NMR): Unable to determine by NMR due to overlapping signals.
Number fraction of polyolefin (NMR): 0.49.
$M_n$ (NMR)=4,200 g/mol, $M_n$ (GPC)=4,300 g/mol; $M_w/M_n$ (GPC)=1.3.
(vii) isoPP-PLA
Reagents: 200 mg isoPP-HEA, 6.2 μg Sn(Oct)$_2$, 344 mg rac-lactide, 12 ml of toluene, heated for 24 h.
Conversion of isoPP-HEA to isoPP-PLA (NMR): Quantitative*.
Number fraction of polyolefin (NMR): 0.51.
$M_n$ (NMR)=56,000 g/mol, $M_n$ (GPC)=60,000 g/mol, $M_w/M_n$ (GPC)=1.4.

*The meaning of "quantitative conversion" is discussed below (Section VI. *NMR Conversion Sensitivity Experiments*).

B. General Procedure for ATRP of Styrene

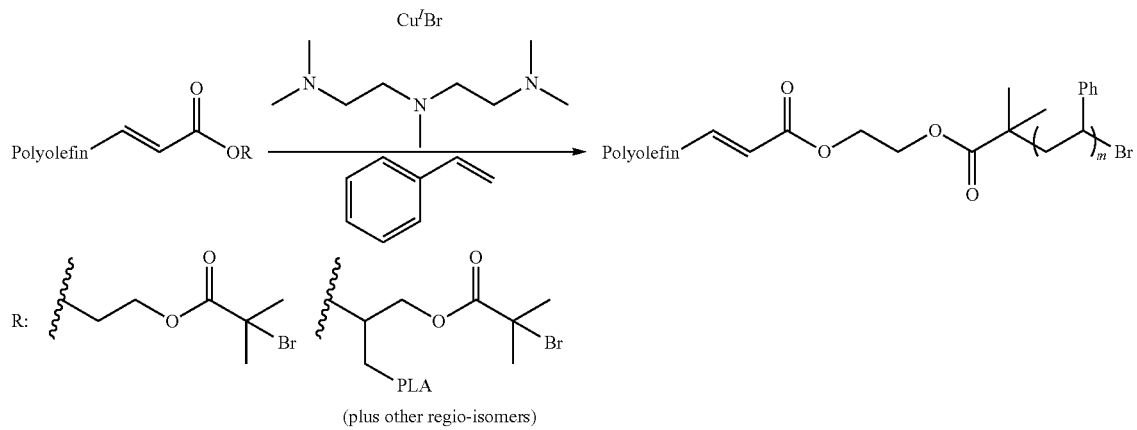

(plus other regio-isomers)

This procedure was adopted from the literature. See Q. Ma, K. L. Wooley, *J. Polym. Sci. Part A Polym. Chem.* 2000, 38, 4805-4820, which is incorporated herein by reference.

In a round bottom flask, polymer and toluene were mixed and heated to 120° C. until a homogeneous mixture was formed. (Warning: Since toluene's boiling point is 110° C., electrical tape was used to secure a rubber septum on to the round bottom.) The solution was maintained at 120° C. and a mixture of styrene, CuBr, and N,N,N',N'',N''-pentamethyldiethylenetriamine (PMDETA) was injected rapidly. The mixture was allowed to stir at 120° C. for 20 min. The blend was then quickly cooled to 110° C. and poured hot into a large excess of methanol. The resulting precipitates were collected by filtration. The collected solid was re-dissolved into toluene and re-precipitated in excess methanol two more times. The final collected solid was dried under vacuum at 50° C. overnight to yield a white polymer.

(i) 1-HDPE-PS
Reagents: 100 mg 1-HDPE-BIEA, 47.8 mg CuBr, 57.8 mg PMDETA, 4.8 ml styrene, and 2 ml of toluene.
Conversion of 1-HDPE-BIEA to 1-HDPE-PS (NMR): Quantitative*.
Number fraction of polyolefin (NMR): 0.46.
$M_n$ (NMR)=4,300 g/mol, $M_n$ (GPC)=5,000 g/mol; $M_w/M_n$ (GPC)=1.1.
*The meaning of "quantitative conversion" is discussed below (Section VI. *NMR Conversion Sensitivity Experiments*).

(ii) 1-HDPE-PLA-PS
Reagents: 200 mg/HDPE-PLA-Br, 23.0 mg CuBr, 27.7 mg PMDETA, 4.6 ml styrene, and 8 ml of toluene.
Conversion of 1-HDPE-PLA-Br to 1-HDPE-PLA-PS (NMR): Unable to determine by NMR due to overlapping signals.
Number fraction of polyolefin (NMR): 0.44.
Number fraction of polystyrene (NMR): 0.26.
$M_n$ (NMR)=7,100 g/mol, $M_n$ (GPC)=7,700 g/mol; $M_w/M_n$ (GPC)=1.3.

C. Procedure for Anionic Polymerization of tBuGE

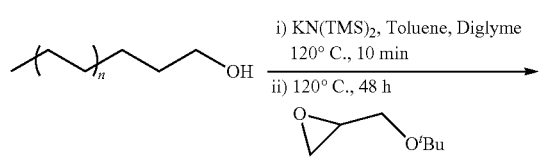

-continued

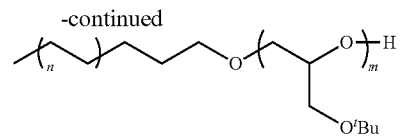

This procedure was adopted from the literature. See M. Erberich, H. Keul, M. Möller, *Macromolecules* 2007, 40, 3070-3079, which is incorporated herein by reference.

In a round bottom flask, polymer (200 mg), KN(TMS)$_2$ (20 mg), toluene (4 ml) and diglyme (4 ml) were mixed and heated at 120° C. for 10 min. (Warning: Since toluene's boiling point is 110° C., electrical tape was used to secure a rubber septum on to the round bottom.) The solution was maintained at 120° C. and tBuGE (2.8 ml) was injected rapidly. The mixture was allowed to stir at 120° C. for 48 h. The blend was then concentrated by distillation (80° C., 0.1 mmHg).

Conversion of 1-HDPE-OH to 1-HDPE-P(tBuGE) (NMR): Unable to determine by NMR due to overlapping signals.
Number fraction of polyolefin (NMR): 0.29, $M_n$ (NMR)=9,000 g/mol, $M_n$ (GPC)=7,500 g/mol; $M_w/M_n$ (GPC)=1.2.

V. Homo-Coupling Experiments

A. Procedure for the Synthesis of (1-HDPE)-(1-HDPE)

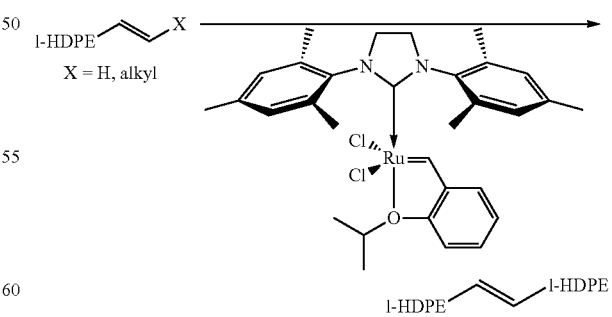

In a round bottom flask, 1-HDPE (400 mg, $M_n$ (NMR)=800 g/mol) and toluene (8 ml) were mixed and heated to 120° C. until a homogeneous mixture was formed. (Warning: Since toluene's boiling point is 110° C., electrical tape was used to secure a rubber septum on to the round bottom.) The solution was maintained at 120° C. and a syringe pump was utilized to inject HG-catalyst (6 mg, 0.0096 mmol) dissolved in toluene (2 ml) over 30 mins. After the addition was completed, the mixture was heated at 120° C. for an additional 30 mins before precipitating the polymer in methanol. The product was analyzed by NMR.

Conversion of l-HDPE to (l-HDPE)-(l-HDPE) (NMR): Quantitative, $M_n$ (NMR)=1,200 g/mol.

B. Procedure for the Synthesis of (HEA)-(HEA)

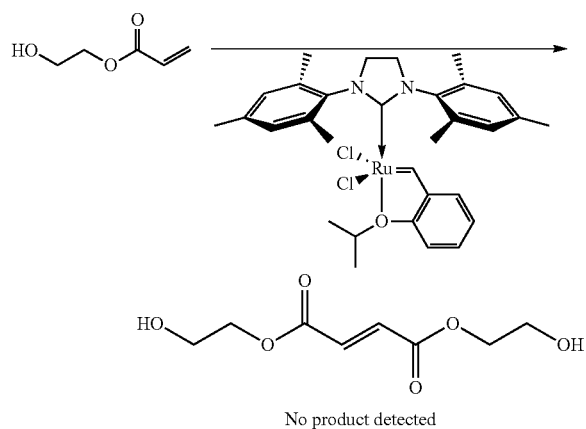

No product detected

In a round bottom flask, HEA (200 mg, 1.72 mmol) and toluene (4 ml) were mixed and heated to 120° C. until a homogeneous mixture was formed. (Warning: Since toluene's boiling point is 110° C., electrical tape was used to secure a rubber septum on to the round bottom.) The solution was maintained at 120° C. and a syringe pump was utilized to inject HG-catalyst (108 mg, 0.17 mmol) dissolved in toluene (1 ml) over 30 mins. After the addition was completed, the mixture was heated at 120° C. for an additional 30 mins before removing the solvent via evaporation. The product was analyzed by NMR.

Conversion of HEA to (HEA)-(HEA): 0%*, only unreacted HEA observed.

*The NMR signals for the targeted product are reported in the literature. See J. L. Charlton, S. Maddaford, Can. J. Chem. 1993, 71, 827-833.

VI. NMR Conversion Sensitivity Experiments

Since NMR was used as the primary form of characterization to determine the conversion of macromonomers into block copolymers, we believed it was necessary to ascertain the limits of its sensitivity. We ran experiments seeking to give a specific meaning to the term "quantitative conversion" for the range of polymers produced in this work. It is logical to consider that looking at the end groups of polymers will be more difficult for polymers of increasing molecular weights. Thus, we characterized the sensitivity of NMR for three different polymer molecular weights, l-HDPE (700 g/mol), h-HDPE (18,000 g/mol) and HBPE (89,000 g/mol).

A. Procedure for Determining the Sensitivity of $^1$H NMR for the Synthesis of l-HDPE In a glass beaker, l-HDPE-HEA (1 g) and l-HDPE (1 mg) were dissolved in 10 ml of boiling toluene. The mixture was then precipitated in methanol and dried. The collected solid was re-dissolved in boiling toluene and precipitated 2 more times to ensure thorough mixing of samples. The solid mixture was analyzed by $^1$H NMR with a conc. 80 mg/ml in $d_2$-TCE (the same concentration used for all l-HDPE containing samples). The $^1$H NMR parameters used for all data collection was: Varian Unity 500 MHz, 16 scans, relaxation time 8 sec.

Figure 5:
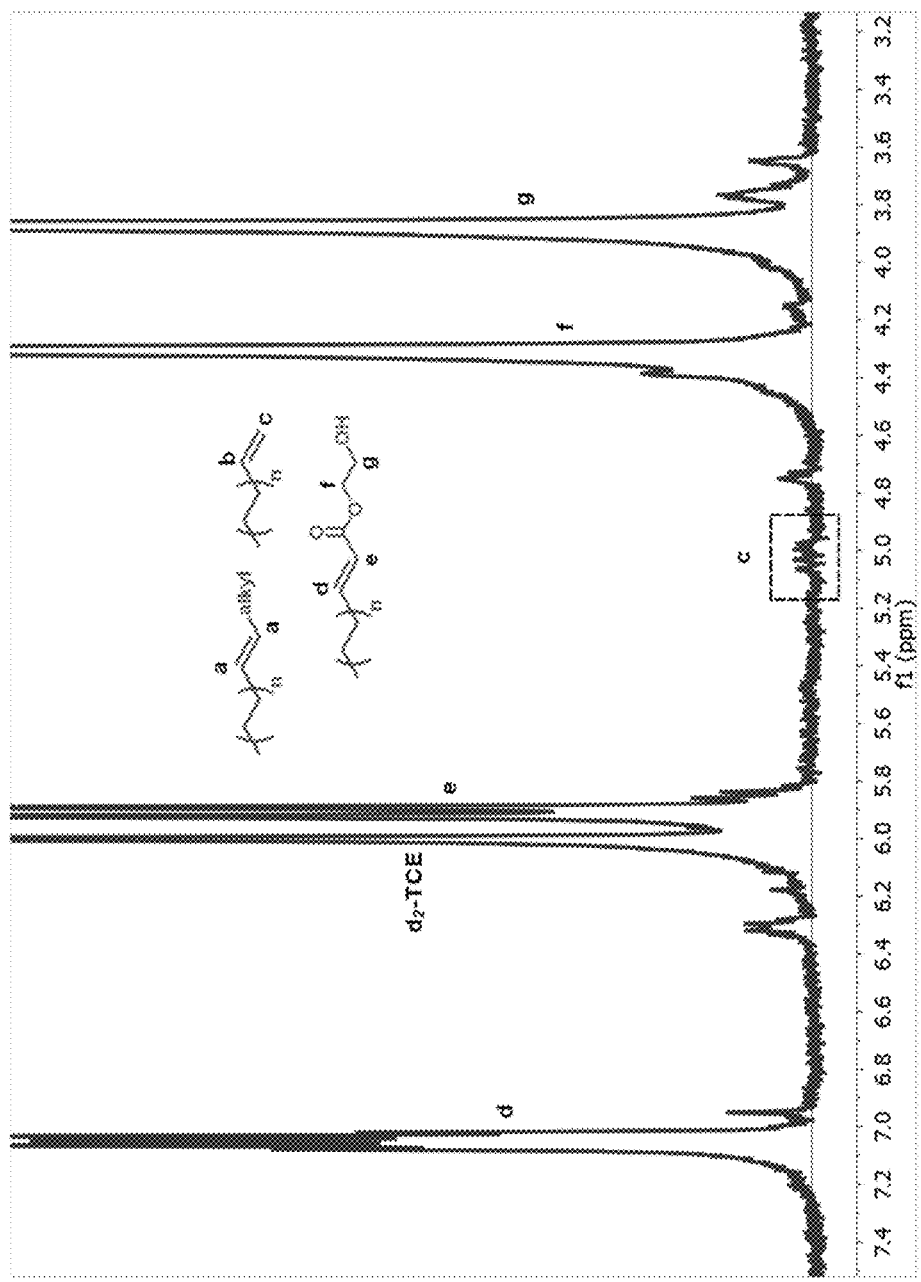
FIG. 5. $^1$H NMR of l-HDPE with spike ($d_2$-TCE, 95° C.).

As seen in FIG. 5, we can identify 0.1% contamination in our l-HDPE. Thus, we will set quantitative conversion for these types of materials at 99.9%.

B. Procedure for Determining the Sensitivity of $^1$H NMR for the Synthesis of h-HDPE In a glass beaker, h-HDPE-HEA (1 g) and h-HDPE (10 mg) were dissolved in 10 ml of boiling toluene. The mixture was then precipitated in methanol and dried. The collected solid was re-dissolved in boiling toluene and precipitated 2 more times to ensure thorough mixing of samples. The solid mixture was analyzed by $^1$H NMR with a conc. 80 mg/ml in $d_2$-TCE (the same concentration used for all h-HDPE, synPP, isoPP, and LLDPE containing samples). The $^1$H NMR parameters used for all data collection was: Varian Unity Inova NMR 600 MHz, 16 scans, relaxation time 8 sec.

Figure 6:
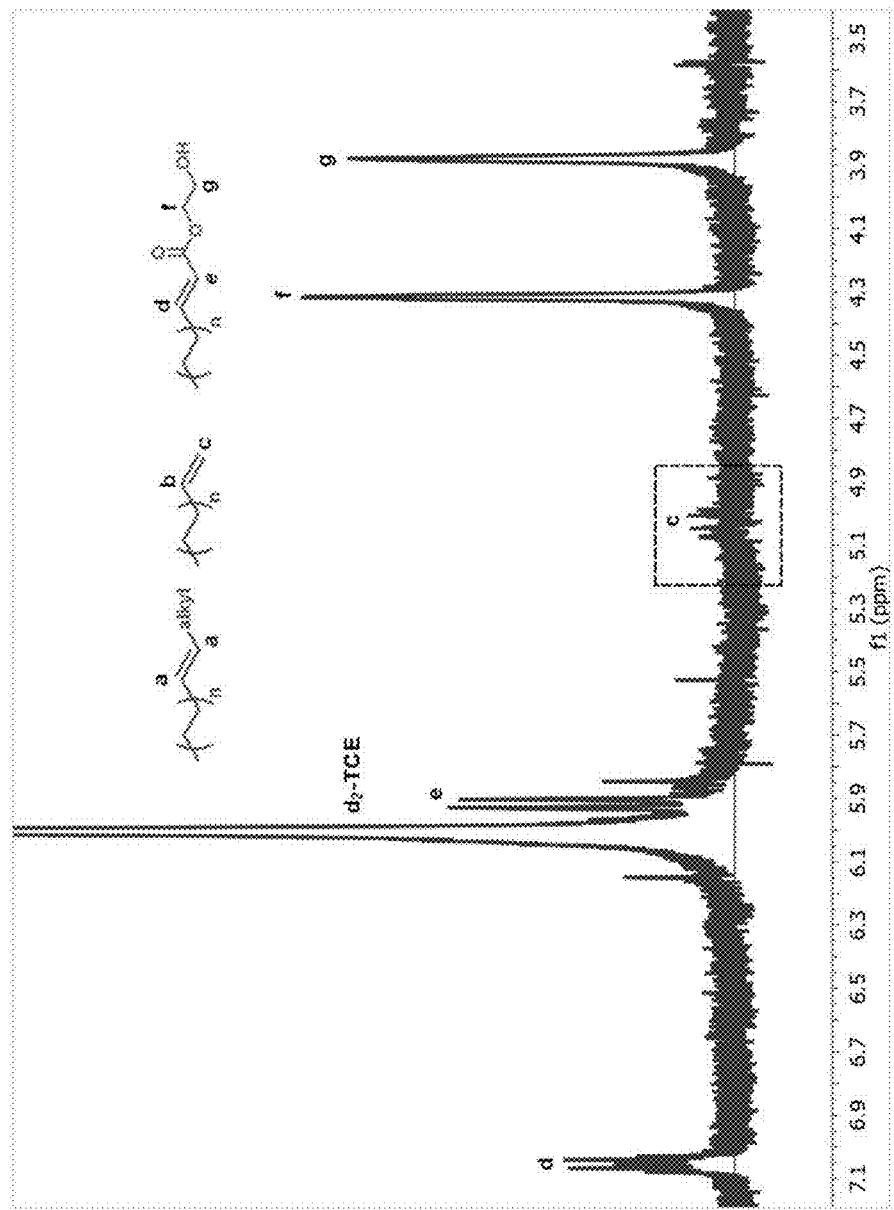
FIG. 6. $^1$H NMR of h-HDPE with spike ($d_2$-TCE, 120° C.).

As seen in FIG. 6, we can identify 1% contamination in our h-HDPE. Thus, we will set quantitative conversion for these types of materials at 99%.

C. Procedure for Determining the Sensitivity of $^1$H NMR for the Synthesis of HBPE In a glass beaker, HBPE-HEA (1 g) and HBPE (50 mg) were dissolved in 10 ml of toluene. The mixture was stirred for 12 hours and toluene was removed. The residual mixture was analyzed by $^1$H NMR with a conc. 120 mg/ml in $d_2$-TCE (the same concentration used for all HBPE, containing samples). The $^1$H NMR parameters used for all data collection was: Bruker AVANCE III 500 MHz spectrometer, 32 scans, relaxation time 8 sec.

Figure 7:
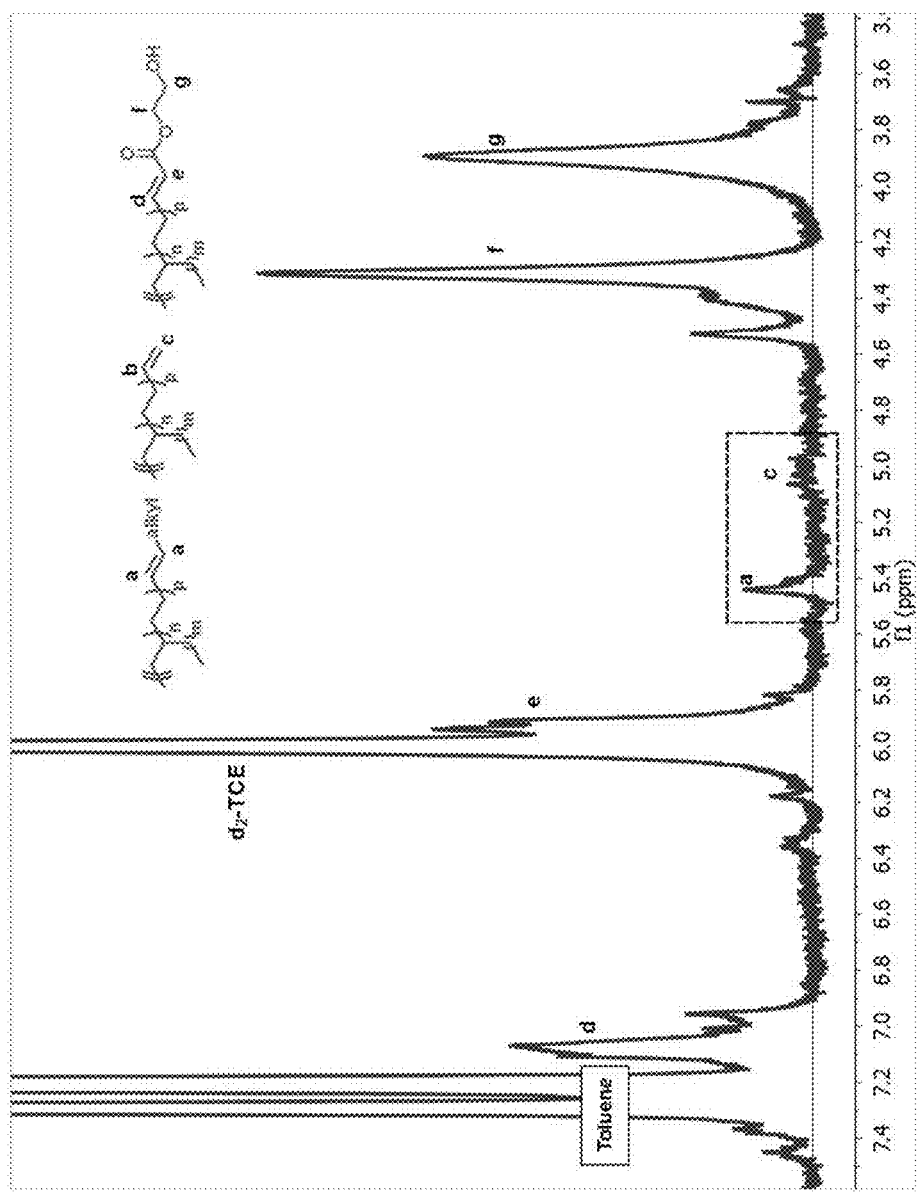
FIG. 7. $^1$H NMR of HBPE with spike ($d_2$-TCE, 120° C.).

As seen in FIG. 7, we can identify 5% contamination in our HBPE. Thus, we will set quantitative conversion for these types of materials at 95%.

Summation

We have developed and described herein a facile method to synthesize polyolefin containing block copolymers by implementing three catalytic reactions subsequently. A series of olefin terminated polyolefins were synthesized by catalytic insertion polymerization. These polyolefins were then functionalized by cross metathesis reactions to yield polyolefin macroinitiators, which then could further be converted into various polyolefin containing block copolymers by three different controlled polymerizations. The absence of homopolymer impurities showcases the high conversion of each step of the transformation. The large range of apolar and polar block-copolymers that are accessible by coordinative polymerizations, anionic polymerizations, and controlled radical polymerizations make this system a powerful platform to generate a wide range of polyolefin containing materials. The use of highly active catalysts in each step of the process results in an overall process with unprecedented productivity lending itself to potential industrial applications.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A method for preparing a polyolefin-containing block copolymer via three consecutive reactions comprising:
   (a) preparing an alkenyl terminated polyolefin via an insertion polymerization reaction of an olefin monomer;
   (b) preparing a polyolefin macroinitiator by functionalizing the alkenyl end group of the polyolefin of step (a) via a catalytic cross metathesis reaction; and
   (c) carrying out a living polymerization reaction initiated by the polyolefin macroinitiator of step (b);
to provide the polyolefin-containing block copolymer.

2. The method of claim 1 where the polyolefin-containing block copolymer comprises polyethylene, polypropylene, poly(1-olefin) or a combination thereof.

3. The method of claim 1 where the polyolefin-containing block copolymer comprises a star-shaped polymer.

4. The method of claim 1 where the olefin monomer of step (a) has the structure of Formula (I):

(I)

where R is linear or branched $C_{1-18}$ alkyl.

5. The method of claim 4 where the alkenyl terminated polyolefin of step (a) has the structure of Formula (II):

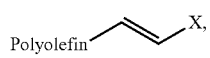
(II)

where X is H or linear or branched $C_{1-18}$ alkyl.

6. The method of claim 5 where the alkenyl terminated polyolefin of step (a) has the structure of one of the following formulas:

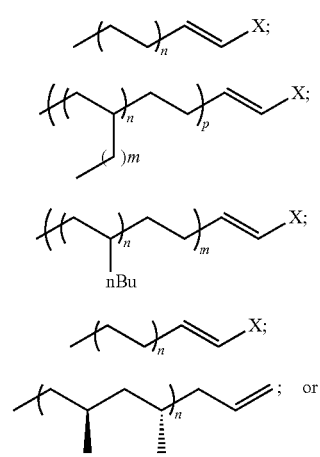

(IV)
(V)
(VI)
(VII)
(VIII)

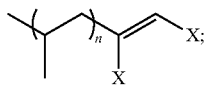
(IX)

where X is H or linear or branched $C_{1-18}$ alkyl.

7. The method of claim 1 where the insertion polymerization reaction of step (a) utilizes a catalyst comprising nickel, titanium, palladium, zirconium, iron, hafnium, cobalt, vanadium or chromium.

8. The method of claim 1 where the catalytic cross metathesis reaction of step (b) comprises adding a ruthenium based methathesis catalyst and a cross-coupling compound to the olefin terminated polyolefin of step (a).

9. The method of claim 8 where the cross-coupling compound comprises an acrylate.

10. The method of claim 1 where the living polymerization reaction of step (c) comprises:
    (i) a coordinative Ring Opening Polymerization (cROP) reaction of a cyclic ester monomer;
    (ii) an anionic Ring Opening Polymerization (aROP) reaction of an epoxide monomer; or
    (iii) an Atom Transfer Radical Polymerization (ATRP) reaction of a vinylic monomer.

11. The method of claim 10 where the cyclic ester monomer comprises a lactide.

12. The method of claim 10 where the epoxide monomer comprises tert-butyl glycidyl ether (tBuGE).

13. The method of claim 10 where the vinylic monomer comprises styrene.

14. A method for preparing a polyolefin-containing block copolymer via three consecutive reactions comprising:
    (a) preparing an alkenyl terminated polyolefin via an insertion polymerization reaction of an olefin monomer;
    (b) preparing a polyolefin macroinitiator by functionalizing the alkenyl end group of the polyolefin of step (a) via a catalytic cross metathesis reaction comprising adding a ruthenium based methathesis catalyst and a cross-coupling compound comprising an acrylate to the alkenyl terminated polyolefin of step (a); and
    (c) carrying out a living polymerization reaction initiated by the polyolefin macroinitiator of step (b) via: (i) running a coordinative Ring Opening Polymerization (cROP) reaction of a cyclic ester monomer; or (ii) hydrogenating the polyolefin macroinitiator of step (b), then running an anionic Ring Opening Polymerization (aROP) reaction of an epoxide monomer;
to provide the polyolefin-containing block copolymer.

15. The method of claim 14 where the cROP reaction of a cyclic ester monomer is catalyzed with tin, aluminum, zirconium, zinc, cobalt or indium.

16. The method of claim 14 where the acrylate comprises 2-hydroxyethyl acrylate (HEA), 2-(2-bromoisobutyryloxy) ethyl acrylate (BIEA) or 1-((2-bromo-2-methylpropanoyl)-3-hydroxypropan-2-yl acrylate.

17. The method of claim 14 where the cyclic ester monomer comprises polylactic acid (PLA) or caprolactone.

18. The method of claim 17 where the polyolefin-containing block copolymer comprises l-HDPE-PLA, h-HDPE-PLA, synPP-PLA, LLDPE-PLA, HBPE-PLA or iso-PP-PLA.

19. The method of claim 14 where the hydrogenated polyolefin macroinitiator of step (c) (ii) is reduced to a primary alcohol with a reducing agent and the aROP reaction of an epoxide monomer is catalyzed with $KN(TMS)_2$.

20. A method for preparing a polyolefin-containing block copolymer via three consecutive reactions comprising:
   (a) preparing an alkenyl terminated polyolefin via an insertion polymerization reaction of an olefin monomer;
   (b) preparing a polyolefin macroinitiator by functionalizing the alkenyl end group of the polyolefin of step (a) via a catalytic cross metathesis reaction comprising adding a ruthenium based methathesis catalyst and a cross-coupling compound comprising an acrylate to the olefin terminated polyolefin of step (a); and
   (c) carrying out a living polymerization reaction initiated by the polyolefin macroinitiator of step (b) via an Atom Transfer Radical Polymerization (ATRP) reaction of a vinylic monomer;
to provide the polyolefin-containing block copolymer.

* * * * *